(12) United States Patent
Ojard

(10) Patent No.: US 7,362,817 B2
(45) Date of Patent: *Apr. 22, 2008

(54) UWB (ULTRA WIDE BAND) INTERFERENCE MITIGATION

(75) Inventor: Eric J. Ojard, San Francisco, CA (US)

(73) Assignee: Broadcom Corproation, Irvine, CA (US)

( * ) Notice: Subject to any disclaimer, the term of this patent is extended or adjusted under 35 U.S.C. 154(b) by 689 days.

This patent is subject to a terminal disclaimer.

(21) Appl. No.: 10/873,916

(22) Filed: Jun. 22, 2004

(65) Prior Publication Data

US 2005/0013387 A1    Jan. 20, 2005

Related U.S. Application Data

(60) Provisional application No. 60/488,623, filed on Jul. 18, 2003.

(51) Int. Cl.
*H04B 15/00* (2006.01)
*H04B 1/00* (2006.01)

(52) U.S. Cl. ............... 375/285; 375/132; 375/260; 455/63.1

(58) Field of Classification Search ......... 375/132, 375/260, 316, 239; 455/63.1, 67.13, 41.2
See application file for complete search history.

(56) References Cited

U.S. PATENT DOCUMENTS

| | | | | |
|---|---|---|---|---|
| 6,487,253 | B1 * | 11/2002 | Jones et al. | 375/260 |
| 6,590,860 | B1 * | 7/2003 | Sakoda et al. | 370/203 |
| 2002/0150147 | A1 * | 10/2002 | Liang | 375/133 |
| 2004/0008285 | A1 * | 1/2004 | Takahashi et al. | 348/723 |
| 2004/0203403 | A1 * | 10/2004 | Cutcher et al. | 455/63.1 |
| 2004/0228269 | A1 * | 11/2004 | Balakrishnan et al. | 370/208 |

* cited by examiner

*Primary Examiner*—Shuwang Liu
*Assistant Examiner*—David Huang
(74) *Attorney, Agent, or Firm*—Garlick Harrison & Markison; Shayne X. Short

(57) ABSTRACT

UWB (Ultra Wide Band) interference mitigation. A novel solution is presented whereby various piconet operable devices are operated to support a relatively structured interference pattern. The devices operate cooperatively (e.g., within multiple piconets that may be in relatively close proximity) such that undesirable symbol collisions generate relatively structured interference (e.g., a structured interference pattern). A piconet operable device (e.g., a communication transceiver or receiver) operating therein includes intelligence such that it may detect a symbol that has undergone an undesirable symbol collision. Then, after those symbols have been identified, they may be modified appropriately so the overall performance of the piconet may be kept at a high performance level. For example, those symbols having an energy (or power) above a predetermined threshold (such as an expected energy level or a power level) may be appropriately de-weighted.

29 Claims, 20 Drawing Sheets

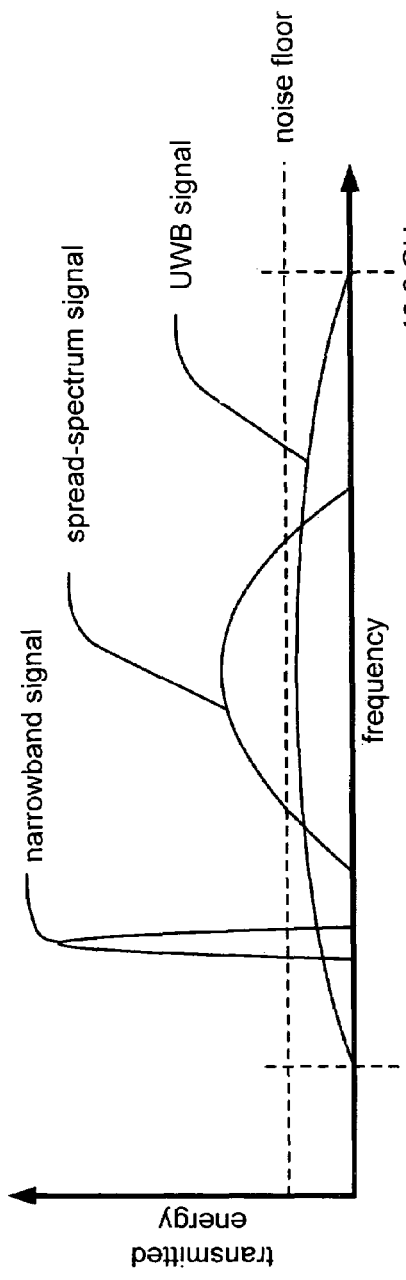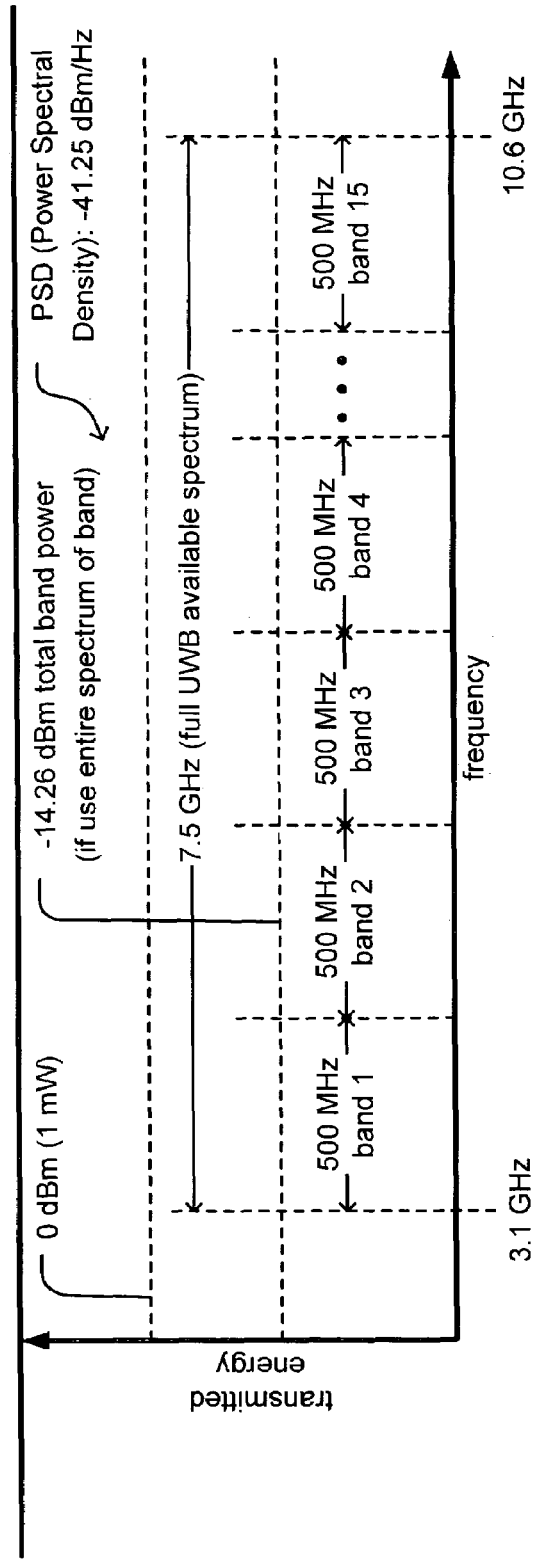

piconet (shown in wireless communication system embodiment)

CDMA (Code Division Multiple Access)

OFDM (Orthogonal Frequency Division Multiplexing) modulation

SOPs (Simultaneously Operating Piconets) within relatively close proximity (having some overlap)

fast frequency hopping with multipath and interference

SH-OFDM (Slow Hopping-Orthogonal Frequency Division Multiplexing)

reduced duty cycle SH-OFDM (Slow Hopping-Orthogonal Frequency Division Multiplexing)

3 band simulation result (simulation 1)

3 band simulation result (simulation 2 - ISR (Interference to Signal Ratio) held constant, and noise varied)

7 band simulation result

3rd order elliptical LPF (Low Pass Filter) employed at transmitter and receiver (or a transceiver)

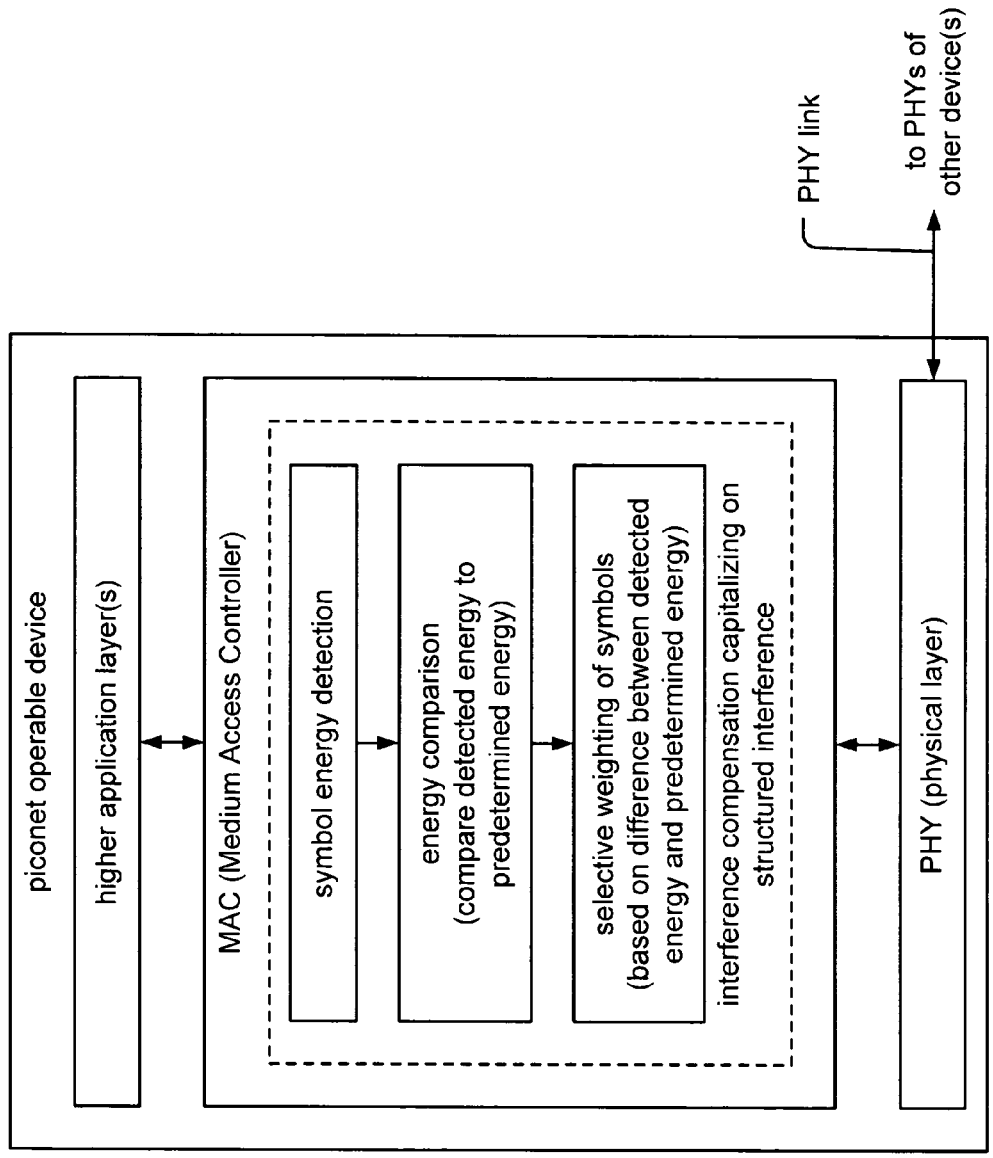

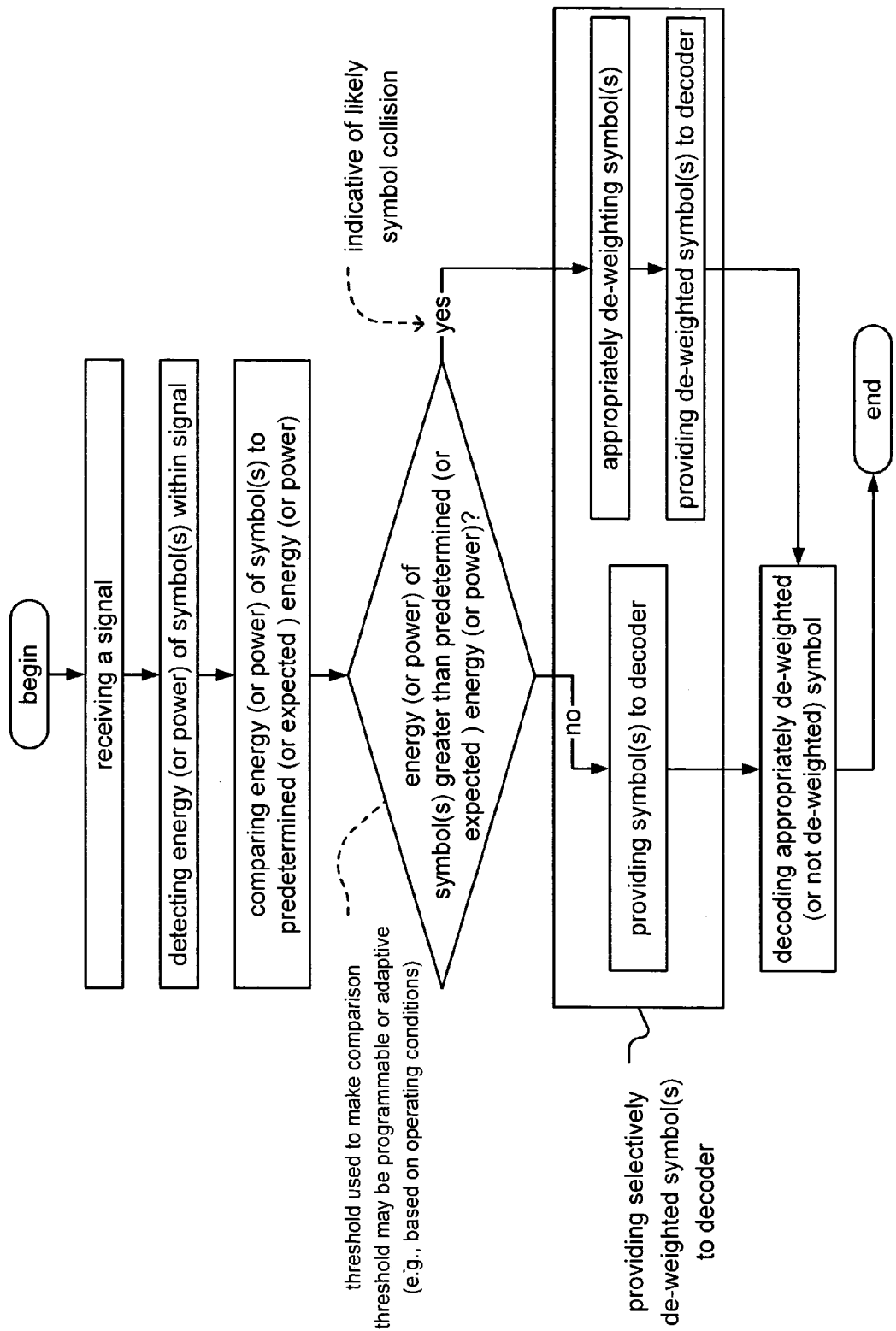

UWB (ULTRA WIDE BAND) INTERFERENCE MITIGATION

CROSS REFERENCE TO RELATED PATENTS/PATENT APPLICATIONS

The present U.S. Utility patent application claims priority pursuant to 35 U.S.C. § 119(e) to the following U.S. Provisional Patent Applications which is hereby incorporated herein by reference in its entirety and made part of the present U.S. Utility patent application for all purposes:

1. U.S. Provisional Application Ser. No. 60/488,623, entitled "UWB (Ultra Wide Band) interference mitigation," filed Jul. 18, 2003, pending.

BACKGROUND OF THE INVENTION

1. Technical Field of the Invention

The invention relates generally to communication systems; and, more particularly, it relates to receive processing (demodulation and decoding) of signals received within such communication systems.

2. Description of Related Art

Data communication systems have been under continual development for many years. In recent years, the development of piconet type communication systems has been under increasing development. A piconet may be viewed as a network that is established when two devices connect to support communication of data between themselves. Sometimes, piconets are referred to as PANs (Personal Area Networks). These piconets typically operate within a region having a radius of up to approximately 10 meters.

As is known, the Bluetooth® communication standard is the first such PAN communication standard that has been developed. In accordance with the Bluetooth® communication standard, the communication between the various devices in such a piconet is strictly performed using an M/S (Master/Slave) configuration. Each of the devices within such a Bluetooth® piconet is M/S capable. Typically one of the devices (sometimes referred to as piconet controller in this situation), or a first device within the Bluetooth® piconet, transmits a beacon signal (or an access invitation signal) while operating as the "master" device of the Bluetooth® piconet to the other "slave" devices of the Bluetooth® piconet. In other words, the "master" device of the Bluetooth® piconet polls the other "slave" devices to get them to respond.

However, other piconets may be implemented such that the devices do not operate according to such an M/S (Master/Slave) type relationship. In such instances, various piconet operable devices operate may be referred to as PNCs (piconet coordinators) and DEVs (user piconet devices that are not PNCs). The PNCs operate to coordinate the communication between themselves and the DEVs within the piconet. Sometimes, such a PNC may be implemented to operate as a master with respect to the 1 or more DEVs that operate as slaves, but this need not be the case in all instances—the strict M/S relationship is typically the case only in a Bluetooth® piconet.

In even some other instances, two or more piconets operate cooperatively such that at least two piconets operate such that they share at least one common device in a scatternet implementation. For example, in a scatternet, a single DEV may interact with two or more PNCs. This implementation will allow various devices within different piconets that are located relatively far from one another to communicate through the PNCs of the scatternet. However, within a scatternet implementation, a problem may arise such that each of the individual piconets must be able to operate in relative close proximity with other piconets without interfering with one another. This inherently requires a great deal of synchronization between the piconets, which may be very difficult to achieve in some instances. It is also noted that independently operating piconets, not implemented within a scatternet implementation, may also suffer from deleterious effects of interference with other piconets located within relative close proximity.

Some PAN communication standards and recommended practices have been developed (and some are still being developed) by the IEEE (Institute of Electrical & Electronics Engineers) 802.15 working group. These standards and recommended practices may generally be referred to as being provided under the umbrella of the IEEE 802.15 working group. Perhaps the most common standard is the IEEE 802.15.1 standard which adopts the core of Bluetooth® and which generally can support operational rates up to approximately 1 Mbps (Mega-bits per second).

The IEEE 802.15.2 recommended practice specification has been developed in an effort to support the co-existence of the IEEE 802.15.1 Bluetooth® core with virtually any other wireless communication system within the approximate 2.4 GHz (Giga-Hertz) frequency range. As some examples, the IEEE 802.11a and IEEE 802.11g WLAN (Wireless Local Area Network) standards both operate within the approximate 2.4 GHz frequency range. This IEEE 802.15.2 recommended practice specification has been developed to ensure that such a WLAN and a piconet may operate simultaneously within relatively close proximity of one another without significant interference with one another.

In addition, the IEEE 802.15.3 high data rate PAN standard has been developed in an effort to support operational rate up to approximately 55 Mbps. In this IEEE 802.15.3 standard, the PNCs and DEVs do not operate according to an M/S relationship as they do according to Bluetooth®. In contradistinction, a PNC operates generally as an AP (Access Point) and manages the various DEVs such that they are guaranteed to perform their respective communication according to their appropriate time slots thereby ensuring proper performance and operation within the piconet. An extension of the IEEE 802.15.3 high data rate PAN standard is the IEEE 802.15.3 WPAN (Wireless Personal Area Network) High Rate Alternative PHY Task Group 3a (TG3a). This is sometimes referred to the IEEE 802.15.3a extended high data rate PAN standard, and it can support operational rates up to 480 Mbps.

Yet another standard developed by the IEEE 802.15 working group is the IEEE 802.15.4 low data rate PAN standard that generally supports data rates within the range of approximately 10 kbps (kilo-bits per second) and 250 kbps.

There are several proposals currently being discussed for the IEEE 802.15.3 WPAN (Wireless Personal Area Network) High Rate Alternative PHY Task Group 3a (TG3a). Some of the ideas being discussed are based on a type of fast-frequency hopping sometimes referred to as time-frequency interleaving. These proposed solutions that employ time-frequency interleaving (that employ relatively fast-frequency hopping) are typically discussed as being implemented such that a single pulse is sent in each frequency band per frequency hop. The transmitted signal then hops between a fixed number (e.g., N) frequency bands in a periodic manner. In these proposed solutions, N is a typically a small integer (e.g. equal to or less than 7).

As briefly referred to above, as the proximity of piconets continue to grow ever closer, there is a problem that arises when the communication between the various piconets interfere with one another. For example, when communication between a user device and a piconet controller in one piconet is ongoing, and communication between another user device and its corresponding piconet controller in another piconet is also ongoing simultaneously, interference between the two paths of communication can cause degradation in the throughput of both of the communication paths. Moreover, even peer to peer communication between the two user devices in a first piconet and two other user devices in a second piconet may also generate the undesirable interference between the two piconets. This is particularly true in the wireless context.

Moreover, when adjacent piconets are transmitting using different hopping patterns, the signals can collide even once per period, resulting in a spreading gain of N. In most of these TG3a proposals, the time per hop is much greater than the inverse of the bandwidth of each frequency band, meaning that there is inevitably extra "dead time" that occurs between the various pulses of the communication within the piconet. One of the detrimental effects of such a proposal is that these proposed communication systems do not achieve the full available spreading gain. This directly results in suboptimal performance relative to what is possible using the available band spectrum of such communication systems.

There has been a great deal of development recently in seeking to enable the simultaneous operation of piconets within relatively close proximity with one another (without suffering significant deleterious effects such as degradation of performance, large numbers of collisions of transmitted symbols within the various piconets, and other such deleterious effects). Currently, there does not exist in the art a sufficient solution that may accommodate the undesirable effects of symbol collisions within such piconets in a satisfactory manner. While there have been some attempts to try to deal with minimizing these undesirable symbol collisions within such piconets, there does not yet exist a satisfactory manner in which symbol collisions (when they do in fact occur) may be dealt with while maintaining a very high level of performance for all of the devices within the piconet.

Clearly, there exists a great degree of room for improvement in the art of piconets to allow for the simultaneous operations of multiple piconets within relatively close proximity to one another without deleterious interference; this situation may generally be referred to as SOPs (Simultaneously Operating Piconets). If the advent of wireless communications (such as in the Bluetooth® space, the space addressed by IEEE 802.11 and IEEE 802.15 working groups and their corresponding standards and/or recommended practices, as well as other wireless communication spaces), is going to increase and become widely available, there exists a great need for such a solution to be presented to support and allow better and improved operation of SOPs.

BRIEF SUMMARY OF THE INVENTION

Various aspects of the invention can be found in a communication device that operates within a piconet. This communication device may be viewed as being a piconet operable device. The device includes a radio front end, an ADC (Analog to Digital Converter), a demodulator, and a decoder. The radio front end receives and filters a continuous time signal. The ADC that samples the received and filtered continuous time signal thereby generating a discrete time signal and extracting I, Q (In-phase, Quadrature) components there from. The demodulator receives the I, Q components and performs symbol mapping of the I, Q components thereby generating a sequence of discrete-valued modulation symbols. In addition, the demodulator selectively performs interference compensation of a symbol of the sequence of discrete-valued modulation symbols by selectively de-weighting the symbol based on structured interference existent therein. This selective de-weighting of the symbol may include performing no de-weighting in some instances while performing some de-weighting in other instances. The decoder receives the selectively interference compensated symbol and performs decoding thereof making best estimates of at least one information bit contained therein.

In certain embodiments, the demodulator detects an energy of the symbol of the sequence of discrete-valued modulation symbols. The demodulator compares the energy of the symbol to a predetermined energy, and the demodulator determines whether a difference between the energy of the symbol and the predetermined energy exceeds a threshold. When the difference exceeds the threshold, the demodulator appropriately de-weights the symbol using a predetermined de-weighting factor thereby generating a de-weighted symbol. However, when the difference does not exceed the threshold, the demodulator does not modify the symbol. The decoder decodes the de-weighted symbol or the unmodified symbol to make best estimates of the at least one information bit contained therein. The demodulator may modify the threshold in real time based on a change in an operating condition of a piconet in which the piconet operable device is situated. Alternatively, if desired, the threshold may be a predetermined threshold that is programmed into the piconet operable device.

The piconet operable device may be part of one piconet that is operating in a region that is relatively close to another piconet. These relatively close piconets may sometimes be referred to as SOPs (Simultaneously Operating Piconets). From this perspective, the piconet operable device is a first piconet operable device that operates within a first piconet that substantially occupies a first region, and a second piconet operable device operates within a second piconet that substantially occupies a second region. The first region and the second region occupy at least a portion of common space. In some instances, collisions may occur between symbols within the first piconet and symbols within the second piconet occur according to a structured interference pattern. The symbol may be viewed as a first symbol that collides with a second symbol that is received by the second piconet operable device before being received. The first symbol that is processed by the first piconet operable device may be a first OFDM (Orthogonal Frequency Division Multiplexing) symbol of a first plurality of OFDM symbols that is modulated according to a first frequency hopping time-frequency code sequence within the first piconet, and the second symbol processed by the second piconet operable device may be a second OFDM symbol of a second plurality of OFDM symbols that is modulated according to a second frequency hopping time-frequency code sequence within the second piconet. The duty cycle employs by these piconets is relatively shorter in duration that in prior art piconets. For example, the first frequency hopping time-frequency code sequence may employ a duty cycle of approximately one-half when modulating the first plurality of OFDM symbols. Similarly, the second frequency hopping time-frequency code sequence may also employ a duty cycle of approximately one-half when modulating the second plurality of OFDM symbols.

By operating piconets according to this manner described herein, a piconet may accommodate fewer symbol collisions compared to prior art approaches to operating piconets. For example, considering one such example, the first frequency hopping time-frequency code sequence may be employed to operate based on a three band system, and the second frequency hopping time-frequency code sequence may also be employed to operate based on a three band system. When operating according to the various aspects of the invention, symbol collision can be reduced. For example, a symbol collision will only occurs between the first piconet and the second piconet at most one time per three symbols. That is to say, only one or fewer symbol collisions will occur every three symbols compared typically two symbol collisions within a prior art type piconet.

The invention envisions any type of communication device that supports the functionality and/or processing described herein. Moreover, various types of methods may be performed to support the functionality described herein without departing from the scope and spirit of the invention as well.

BRIEF DESCRIPTION OF THE SEVERAL VIEWS OF THE DRAWINGS

FIG. 1A is a diagram illustrating an embodiment of the frequency spectrum of a UWB (Ultra Wide Band) signal when compared to some other signal types according to the invention.

FIG. 1B is a diagram illustrating an embodiment of UWB (Ultra Wide Band) spectrum partitioning into a plurality of sub-bands according to the invention.

FIG. 19 is a diagram illustrating another embodiment of a piconet operable device that supports functionality of interference compensation capitalizing on structured interference (showing PHY (physical layer), MAC (Medium Access Controller), and higher protocol layers) according to the invention.

FIG. 20 is a flowchart illustrating an embodiment of a method for operating a piconet operable device according to the invention.

DETAILED DESCRIPTION OF THE INVENTION

FIG. 1A is a diagram illustrating an embodiment of the frequency spectrum of a UWB (Ultra Wide Band) signal when compared to some other signal types according to the invention. In contradistinction to RF (Radio Frequency) communications that operate by using a narrowband carrier frequency to transmit information, UWB communications operate by sending pulses of energy across a broad frequency spectrum. For example, an RF signal may be viewed as occupying the range of spectra of a narrowband frequency. Also, in contradistinction to a spread-spectrum signal whose intensity (magnitude) generally rises above the noise floor within an available spectrum and also occupies a relatively narrower portion of the available spectrum, a UWB signal may actually be viewed as pulse shaped noise (that may never exceed the noise floor within the available spectrum). A spread-spectrum signal may be viewed as a signal that occupies a frequency band that is much wider than the minimum bandwidth required by the information signal. For example, a transmitter "spreads" the energy (that is typically originally concentrated in narrowband) across a number of frequency band channels on a wider electromagnetic spectrum. Some benefits of a spread-spectrum signal include improved privacy, decreased narrowband interference, and increased signal capacity.

However, a UWB signal's PSD (Power Spectral Density) actually curves across the available spectrum, whereas the PSD of noise generally looks similar across the entire range of the available spectrum. Because of this distinction of shaping of the UWB signal and the noise across the available spectrum, the noise does not fully obliterate a pulse that is transmitted as a UWB signal. It is also important to note that a UWB signal is a function of time, not frequency.

FIG. 1B is a diagram illustrating an embodiment of UWB (Ultra Wide Band) spectrum partitioning into a plurality of sub-bands (or channels) according to the invention. Relatively recently, the FCC (Federal Communications Commission) has defined the available spectrum for UWB communications as being between 3.1 GHz (Giga-Hertz) and 10.6 GHz. In addition, the FCC defined the minimum spectral width of any sub-band (or channel) within the available UWB spectrum to be 500 MHz (Mega-Hertz).

Moreover, this FCC definition allows for a PSD across the UWB spectrum of −41.25 dBm/MHz of bandwidth. As a brief review, 0 dBm is the dB (decibel) measure of power of a signal referenced to 1 mW (milli-Watt). This means that the total power that may be employed by a UWB signal is approximately −14.26 dBm in any individual 500 MHz sub-band (or channel) within the entire available UWB bandwidth of 7.5 GHz. In addition, if a pulse is sent using the entire 7.5 GHz of available UWB bandwidth, then the total power that may be employed by a UWB signal is approximately −2.5 dBm.

Figure 2A:
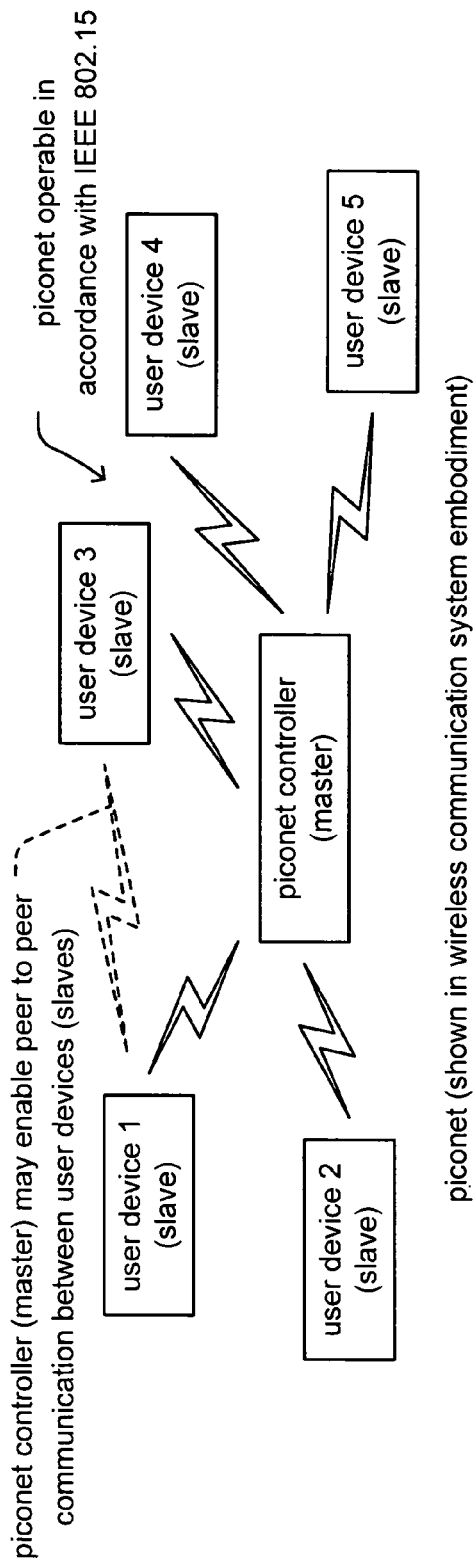
FIG. 2A is a diagram illustrating an embodiment of a piconet or WPAN (Wireless Personal Area Network) (shown as a wireless communication system) that is built according to the invention.

FIG. 2A is a diagram illustrating an embodiment of a piconet or WPAN (Wireless Personal Area Network) (shown as a wireless communication system) that is built according to the invention. As described briefly above, a piconet may be viewed as being the network that is established when any two devices connect to support communication between them. This operation is typically within the context of communication being performed in an M/S (Master/Slave) relationship. The piconet may typically be implemented using a piconet controller (master) and 1 or more user devices (slaves). The user devices (slaves) typically do not communication directly with one another in this embodiment, but with each other through the piconet controller (master). However, 2 user devices (slaves) may be set up by the piconet controller (master) to communicate directly with one another using p2p (peer to peer) communication. This p2p communication set up for the 2 user devices (slaves) is typically performed by the piconet controller (master).

To support communication between each of the plurality of user devices (slaves), simultaneously at some times, and the piconet controller (master), the communication must be implemented in such a way that the communication links between each user device (slave) and the piconet controller (master) do not interfere with the other communication links between the other user devices (slaves) and the piconet controller (master). Moreover, when two or more piconets operate within relatively close proximity to one another, the communication within each of the respective piconets must be implemented in such a way that simultaneously operation of the two or more piconets (e.g., the coexistence and operation) may be performed without interfering with one another.

While it is noted that the user devices (slaves) do not typically communicate directly with one another (that is to say, via the piconet controller (master)), it is also noted that the piconet controller (master) may sometimes operate to enable p2p communication between the 2 user devices (slaves) within the piconet. Moreover, the piconet in this embodiment as well as within other embodiments described herein are all operable in accordance with the conditions and constraints provided by the IEEE (Institute of Electrical & Electronics Engineers) 802.15 standard and may also be implemented such that the piconet is operable in accordance with other wireless communication standards as well. Moreover, this piconet is also operable within the various alternative and subsequent drafts of the IEEE 802.15 standards being developed including the IEEE 802.15 WPAN High Rate Alternative PHY Task Group 3a (TG3a) draft standard.

Figure 2B:
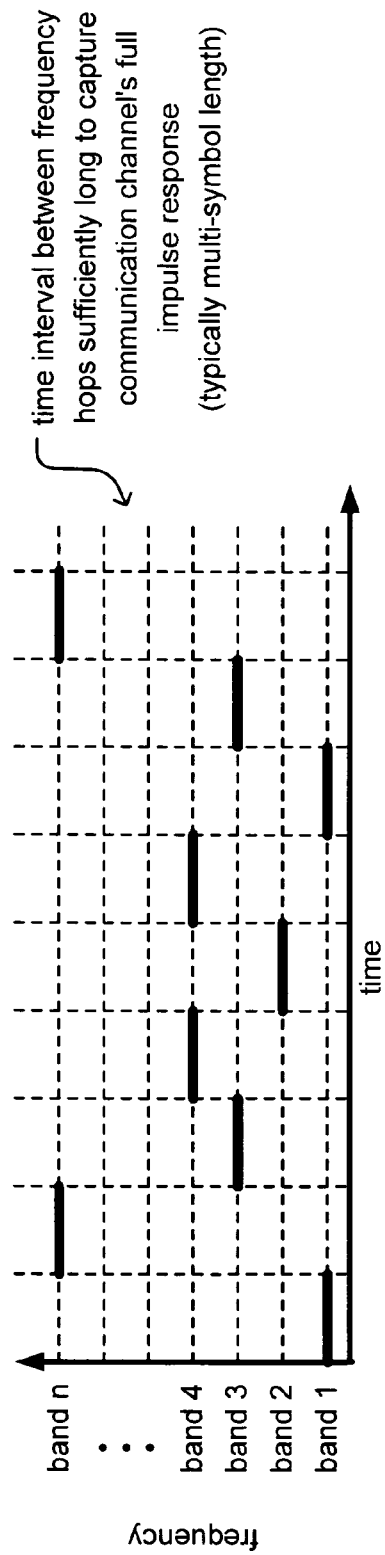
FIG. 2B is a diagram illustrating an embodiment of frequency hopping that may be performed according to the invention.

FIG. 2B is a diagram illustrating an embodiment of frequency hopping that is performed according to the invention. As a function of time, the frequency band (or channel) that is being used will "hop" from one frequency band (or channel) to another. Frequency hopping is one means of operation that may be used to make a communication channel more robust. For example, when noise, such as background noise, is relatively localized to a particular portion of the spectrum, the frequency hopping will help minimize the effects this frequency specific and frequency localized noise.

Frequency hopping may be viewed as a repeated switching of the frequency of a signal during transmission. In a communication system, a transmitter and a receiver operate in synchronization so that each operates at the same frequency at any given time. In this particular embodiment, an available frequency spectrum is sub-divided into n bands (or n channels). The communication operates using a band 1 during a first time interval, then operates using a band n during a second time interval, then operates using a band 3 during a third time interval, and so on as indicated in the diagram.

It is also noted that the time interval between the various frequency hops may be implemented as being sufficiently long so as to permit the capture of a communication channel's full impulse response at the various piconet operable devices within the piconet (e.g., the piconet controller (master) and the user devices (slaves)). This time interval at which the communication system operates at any given frequency will typically be multi-symbol lengths in duration. Alternatively, very fast frequency hopping may be performed when such considerations are not desired or critical.

As an example of the operation of frequency hopping, in the context of a UWB signal, the UWB spectrum may be divided into 15 sub-bands of 500 MHz bandwidth, the frequency hopping may be viewed as hopping between the various 500 MHz bandwidth sub-bands (or channels) as a function of time.

Figure 3:
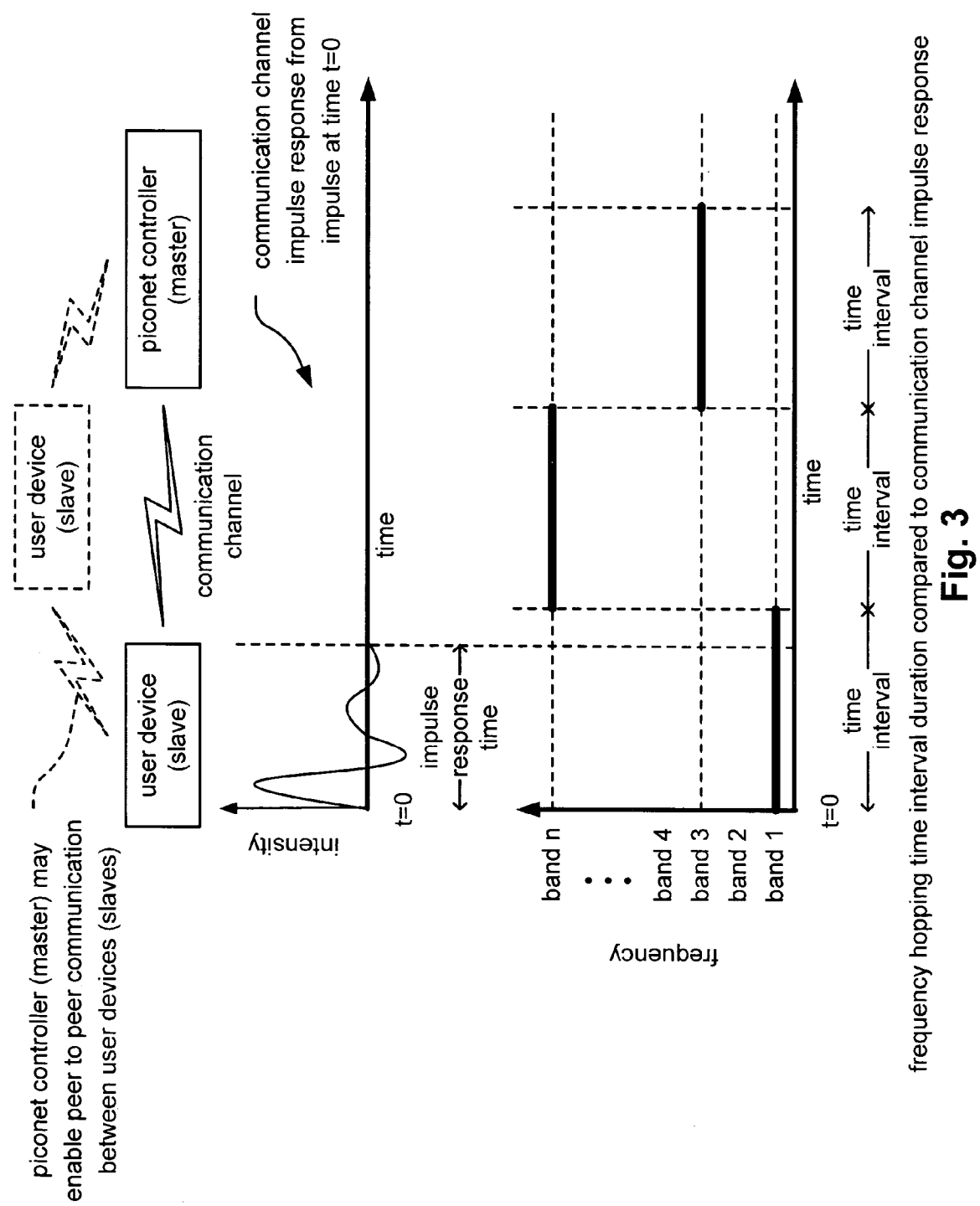
FIG. 3 is a diagram illustrating an embodiment showing comparison of frequency hopping time interval duration compared to a communication channel impulse response according to the invention.

FIG. 3 is a diagram illustrating an embodiment showing comparison of frequency hopping time interval duration compared to a communication channel impulse response according to the invention. The impulse response, as a function of time, is shown for the communication channel between a user device (slave) and a piconet controller (master). This impulse response may be viewed as the response of the communication system when an impulse is provided thereto. The impulse response varies in intensity as a function of time before dissipating. The time that the impulse response takes to dissipate completely may be viewed as the impulse response time of the communication channel.

When compared to frequency hopping performed according to the invention, the time interval at which the communication system operates using a first frequency band (shown as a band 1 during a first time interval) is longer than the impulse response time of the communication channel. This will allow all of the energy of a pulse to be captured when transmitted and when operating at this frequency band. Similarly, when the operation switches to another frequency band according to the frequency hopping time-frequency code sequence, that corresponding time interval will also be longer than the impulse response time of the communication channel.

Within some prior art piconet approaches, frequency hopping alone has been implemented such that the time intervals are typically only of a single symbol's length; this is typically much shorter than the impulse response time of the communication channel. Much of the energy of a transmitted pulse may be lost if the frequency hops are performed too quickly. The longer duration over which the frequency hops are performed according to the invention allows for capturing of all of the energy of the transmitted pulse thereby ensuring more robust and more accurate communications. Alternatively, again, very fast frequency hopping may be performed when such considerations are not desired or critical.

Within the context of the invention, the time-frequency code employed to govern communication between 2 devices within the piconet may be viewed as an operational parameter. This operational parameter may be modified in real time based on a change in another operational parameter that governs communication between the 2 devices. For example, a $1^{st}$ time-frequency code may be employed at one time, and a $2^{nd}$ time-frequency code may be performed subsequently based on a change of another of the operational parameters. Based on a change in the operational parameter of interference of the communication link between 2 devices, as an example, one time-frequency code may more effectively support communication between the 2 devices compared to the other time-frequency codes that are available. As is also described in other of the embodiments of the invention, other operational parameters may also be modified in response to a change in 1 or more of the other operational parameters as well without departing from the scope and spirit of the invention.

Again, as briefly mentioned above, it is also noted that the piconet controller (master) may enable p2p communication between two separate user devices (slaves) within the piconet. The manner of communication described herein with respect to communication between the piconet controller (master) and any one user device (slave) is also applicable to p2p communication that may be performed between two separate user devices (slaves) within the piconet.

Figure 4:
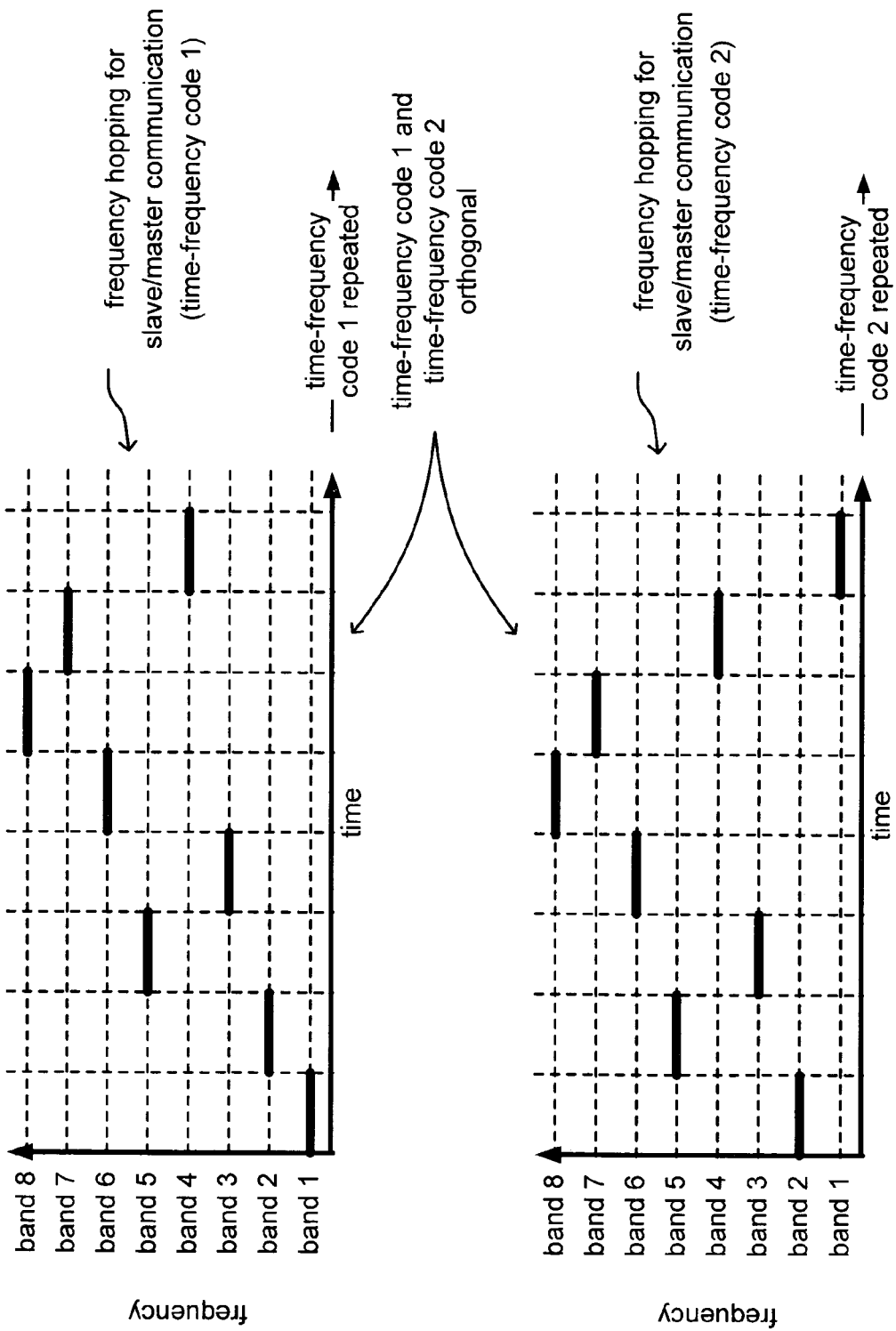
FIG. 4 is a diagram illustrating another embodiment of frequency hopping that is performed according to the invention.

FIG. 4 is a diagram illustrating another embodiment of frequency hopping that is performed according to the invention. The description of this diagram may be viewed as being a specific example of the operational parameter of the time-frequency codes employed to support communication across various PHY (physical layer) links between the various devices within the piconet.

This embodiment shows how two separate piconets (or two separate groups of devices within a piconet) may operate using two separate time-frequency codes that are orthogonal to one another. For example, a first piconet (or first group of devices) performs frequency hopping for slave/master communication using a first time-frequency code (time-frequency code 1). In addition, a second piconet (or second group of devices) performs frequency hopping for slave/master communication using a second time-frequency code (time-frequency code 1). During each time interval, the time-frequency code 1 and the time-frequency code 2 each operate using a different band (or channel). For example, when the time-frequency code 1 operates using the band 1, the time-frequency code 2 operates using the band 2. Similarly, when the time-frequency code 1 operates using the band 2, the time-frequency code 2 operates using the band 5. This orthogonal operation of the 2 time-frequency codes continues for the duration of the respective time-frequency code sequences.

Each of the respective time-frequency code sequences are repeated to support subsequent operation of the respective piconets. This orthogonal operation of employing two time-frequency codes allows more than one piconet to coexist in relative close proximity with one another. In addition, it is noted that all of the user devices (slaves) within a respective piconet (or group of devices) will communicate with their corresponding piconet controller (master) using their time-frequency code sequence, and all of the user devices (slaves) within another respective piconet will communicate with their corresponding piconet controller (master) using their corresponding time-frequency code sequence.

Figure 5:
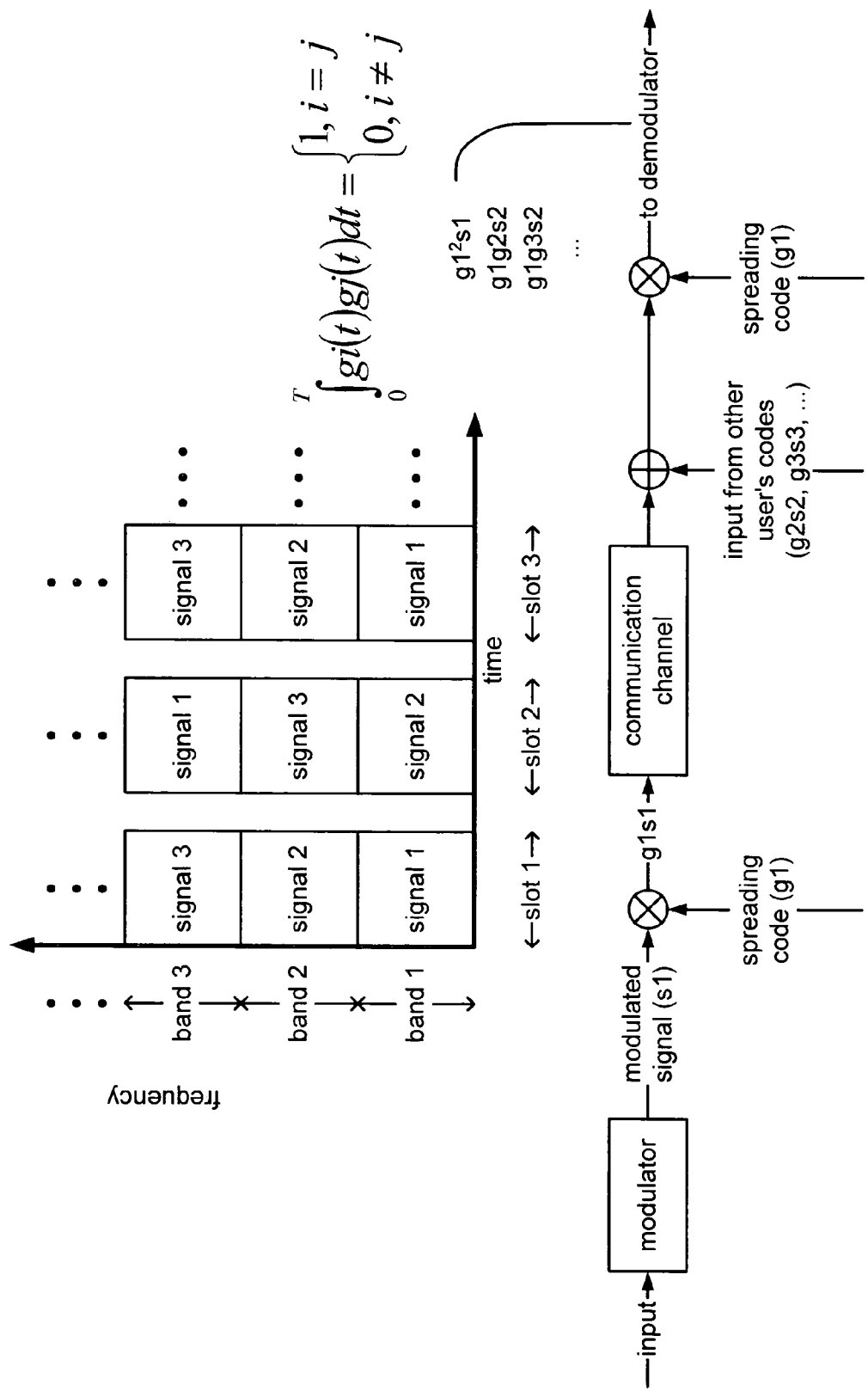
FIG. 5 is a diagram illustrating an embodiment of CDMA (Code Division Multiple Access) that may be employed according to the invention.

FIG. 5 is a diagram illustrating an embodiment of CDMA (Code Division Multiple Access) that may be employed according to the invention. CDMA may be viewed as the short term assignment of a frequency band to various signal sources. At each successive time slot, the band assignments are reordered either adaptively or according to a predetermined sequence. For example, during a time slot 1, a signal 1 operates using a band 1, a signal 2 operates using a band 2, and a signal 3 operates using a band 3. Then, during a time slot 2, the signal 1 operates using the band 3, the signal 2 operates using the band 1, and the signal 3 operates using the band 2. During a time slot 3, the signal 1 operates using the band 1, the signal 2 operates using the band 2, and the signal 3 operates using the band 3.

The operation of communication devices (e.g., users) is performed using a PN (Pseudo-Noise) code that is typically orthogonal to the other PNs codes employed by the other communication devices within the communication system. This PN code is oftentimes referred to as a spreading code. A modulated signal is spread using that spreading code and the spread signal is then transmitted across a communication channel (e.g., a PHY (physical layer) link that communicatively couples 2 devices within the piconet). At a receiver end of the communication channel, this same spreading code (e.g., this PN code) is employed to de-spread the code so that data sent from a particular device may be demodulated by the appropriate destination device.

The operation of CDMA may be better understood when viewed as the transformation of an input signal through a communication system. At a transmitter end of a communication channel, input from a particular user is first provided to a modulator where the data is modulated by a carrier thereby generating a modulated signal (s1). Next, the data-modulated signal is then multiplied by a spreading code (g1) that corresponds to that particular user thereby generating a spread signal (g1s1) that is then provided to the communication channel. This signal may be viewed as a convolution of the frequency spectrum of the modulated signal and the frequency spectrum of the spreading code. Simultaneously, input from other users within the communication system is modulated and spread in an analogous manner.

At the receiver end of the communication channel, a linear combination of all of the spread signals provided by the other users is received, e.g., g1s1+g2s2+g3s3+ . . . and so on for all of the users. At the receiver end, the total received signal is then multiplied by the spreading code (g1) thereby generating a signal that includes $g1^2s1$ plus a composite of the undesired signal (e.g., g1g2s2+g1g3s3+ . . . and so on).

In CDMA, the spreading codes are typically chosen such that they are orthogonal to one another. That is to say, when any one spreading code is multiplied with another spreading code, the result is zero. This way, all of the undesired signals drop out. Given that the spreading codes g1(t), g2(t), g3(t) and so on, the orthogonality of the spreading codes may be represented as follows:

$$\int_0^T gi(t)gj(t)dt = \begin{cases} 1, & i = j \\ 0, & i \neq j \end{cases}$$

This final signal is then passed to a demodulator where the input that has been provided at the transmitter end of the communication channel is extracted and a best estimate is made thereof.

Figure 6:
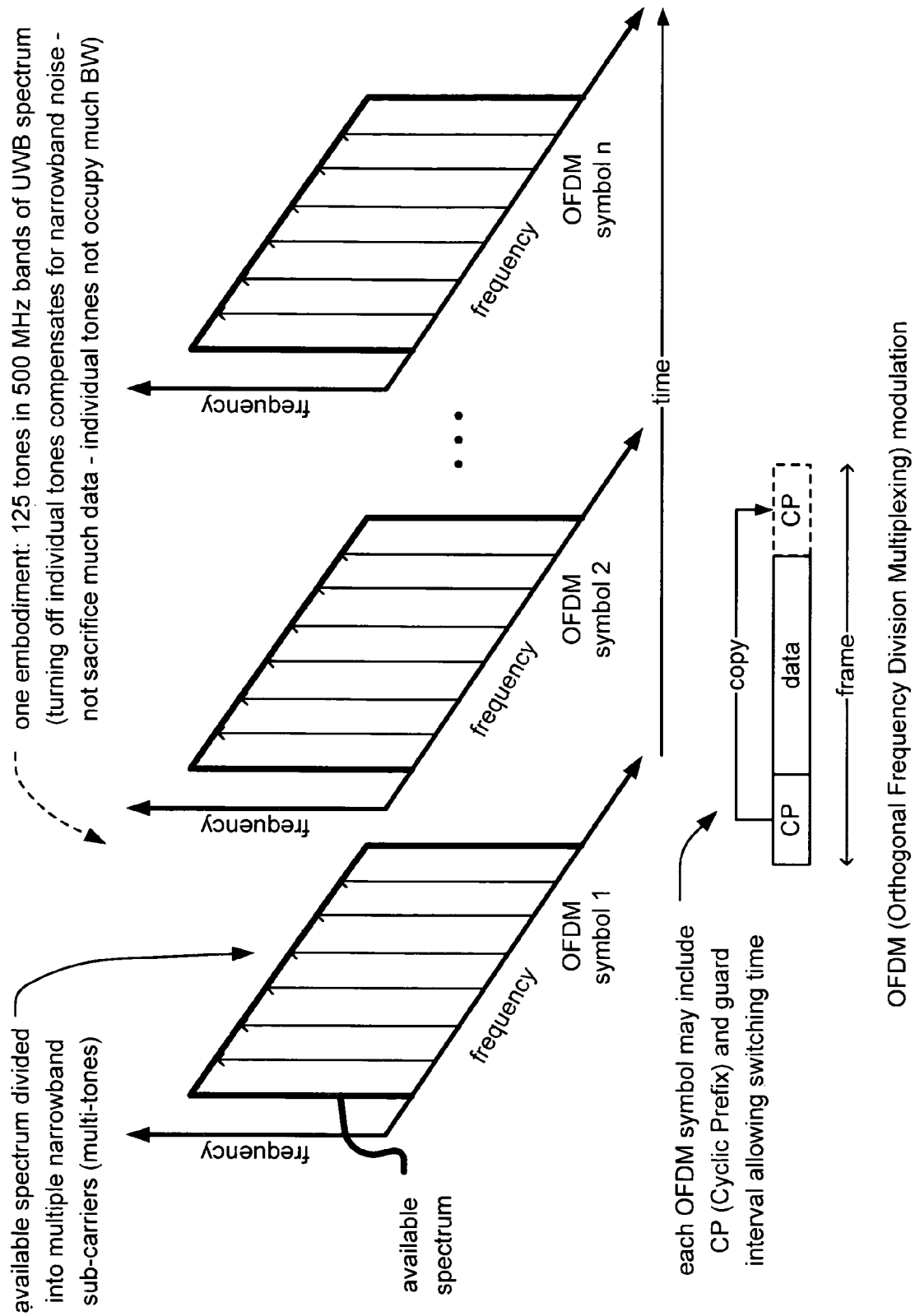
FIG. 6 is a diagram illustrating an embodiment of OFDM (Orthogonal Frequency Division Multiplexing) that may be employed according to the invention.

FIG. 6 is a diagram illustrating an embodiment of OFDM (Orthogonal Frequency Division Multiplexing) modulation that may be employed according to the invention. OFDM modulation may be viewed a dividing up an available spectrum into a plurality of narrowband sub-carriers (e.g., lower data rate carriers). Typically, the frequency responses of these sub-carriers are overlapping and orthogonal. Each sub-carrier may be modulated using any of a variety of modulation coding techniques.

OFDM modulation operates by performing simultaneous transmission of a larger number of narrowband carriers (or multi-tones). Oftentimes a guard interval or guard space is also employed between the various OFDM symbols to try to minimize the effects of ISI (Inter-Symbol Interference) that may be caused by the effects of multi-path within the communication system (which can be particularly of concern in wireless communication systems). In addition, a CP (Cyclic Prefix) may also be employed within the guard interval to allow switching time (when jumping to a new band) and to help maintain orthogonality of the OFDM symbols.

In one UWB embodiment, 125 OFDM tones may be implemented in any one of the 15 sub-bands of 500 MHz bandwidth within the UWB spectrum. Other benefits are achieved using OFDM. For example, the use of multi-tones allows for an effective solution to deal with narrowband interference. For example, a tone that corresponds to the locality of the narrowband interference may be turned off (to eliminate the susceptibility to this narrowband interference) and still provide for efficient operation. This turning off of these one or few tones will not result in a great loss of bandwidth because each individual tone does not occupy a great deal of bandwidth within the available spectrum employed by the OFDM symbol. Therefore, OFDM modulation provides a solution that may be employed in accordance with invention that provides link quality intelligence from the PHY (physical layer) to the higher protocol layers within devices operating within wireless networks (e.g., piconets as one example).

Figure 7:
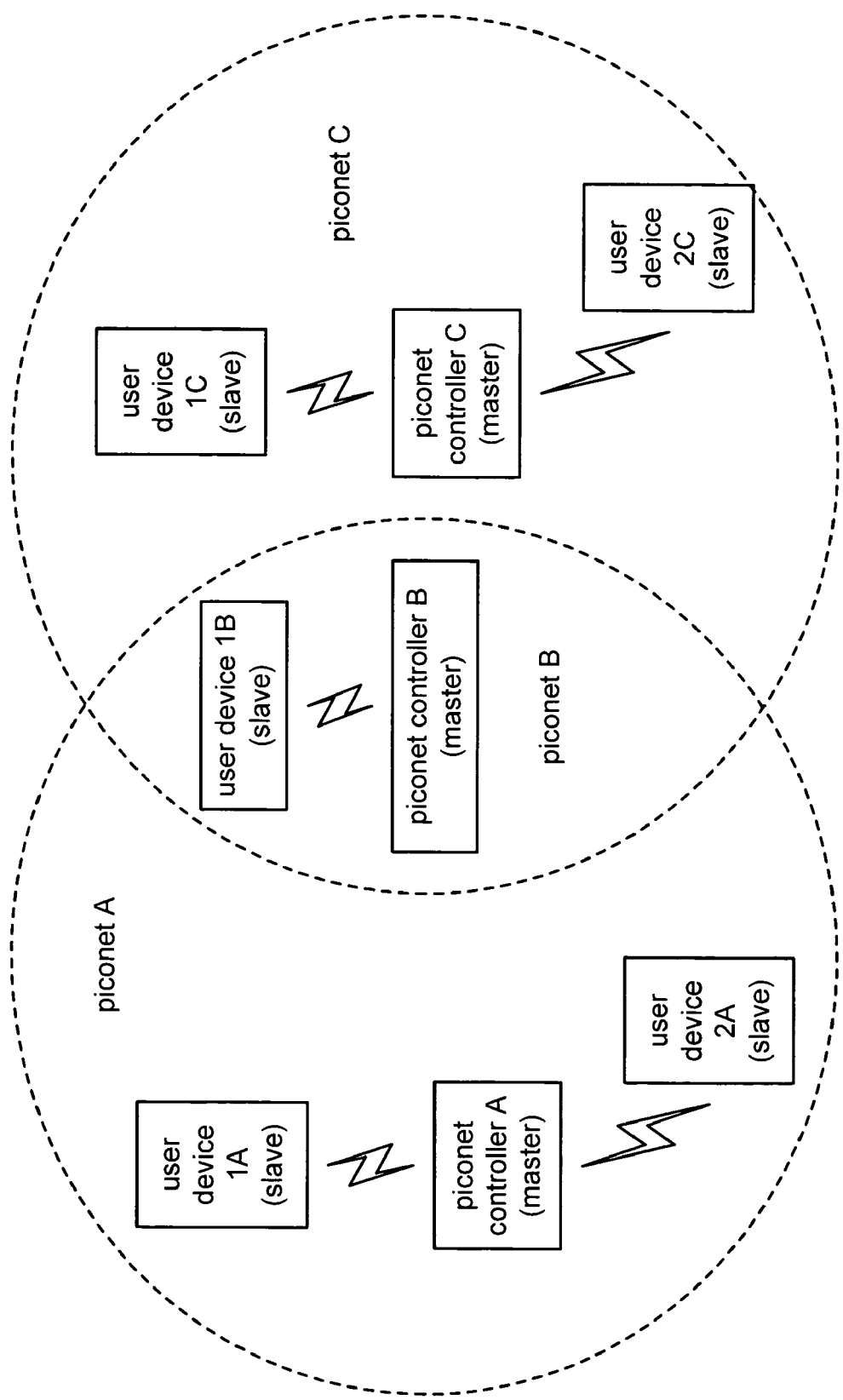
FIG. 7 is a diagram illustrating an embodiment of SOPs (Simultaneously Operating Piconets) within relatively close proximity to one another (having some overlap) according to the invention.

FIG. 7 is a diagram illustrating an embodiment of SOPs (Simultaneously Operating Piconets) within relatively close proximity to one another (having some overlap) according to the invention. This embodiment shows how various piconets may operate in such a way that the individual devices within these piconets are sufficiently close to one another that they may sometimes even associate with different piconets at different times. This inherently requires operating the various piconets in such a way that they do not interfere with one another. For example, each piconet may operate using a different frequency hopping approach. Each piconet may employ a different time-frequency code such that undesirable symbol collisions are kept at a relatively low rate of occurrence. Other operational parameters may alternatively be employed for each of the various piconets. For example, different PN (Pseudo-Noise) codes may be employed to govern the spreading/de-spreading of symbols transmitted within the various piconets. Moreover, even other operational parameters may be implemented such that any undesirable symbol collisions at kept at a relative minimum.

The manner in which the various devices within the piconet operate may be performed in such a way that when symbol collisions do in fact occur (e.g., when interference does occur) the interference has a particular characteristic, namely, a relatively structured interference. Thereafter, using an understanding of this structured interference, intelligent processing of symbols within the various devices may be made so as to support a much higher level of performance than is provided by communication systems whose high end of performance is limited by the AWGN (Additive White Gaussian Noise) existent within the communication system. The performance of a piconet operating this way will typically be limited only by the out of band roll off and front end range (e.g., the radio front end and the filtering performed therein) of a device operating within such a piconet.

Various aspects of the invention operate the various devices within a piconet using a combination of SH-OFDM (Slow Hopping-Orthogonal Frequency Division Multiplexing) and a relatively slower PRF (Pulse Repetition Frequency) than is typically performed within prior art piconets. By operating the various devices of the piconet in such a way, when symbol collisions do in fact occur, they will exhibit the structured interference briefly describe above. Several examples are provided below showing more particularly how symbol collisions will exhibit this structured interference. In addition, various embodiments are also described about how this structure interference may be capitalized upon to ensure a high level of performance of the overall piconet. That is to say, the manner in which receiver processing may be employed is performed in such a way as to operate in an intelligent manner using the intrinsic characteristics and nature of the structured type of interference that may be existent in the received signal. This may be viewed as being performed in such a way that a demodulator, within a communication device, selectively performs interference compensation of a symbol by selectively de-weighting the symbol based on structured interference existent therein. This selective de-weighting of the symbol may include performing no de-weighting in some instances while performing some de-weighting in other instances.

As shown within this embodiment, a piconet A includes a piconet controller A (master) and user devices 1A & 2A (slaves). Similarly, a piconet C includes a piconet controller C (master) and user devices 1C & 2C (slaves). In addition, a piconet B includes a piconet controller B (master) and a user device 1B (slave).

As can be seen, each of these various piconets A, B, and C operate such that they may have a portion of overlap with 1 or more of the other piconets. Some of the devices within these piconets may associate with different piconets at different points in time.

Again, each of the various devices within the piconets A, B, and C may operate using individually selected time-frequency codes that include appropriate combinations of SH-OFDM and a relatively slower PRFs than are typically performed within prior art piconets. By operating the piconets A, B, and C in such a manner that when symbol collisions in the region, they exhibit a relatively structured type of interference. Having an understanding of the nature of this structured interference allows the implementation of a receiver having some intelligence that may appropriately de-weight symbols that have experienced an undesirable symbol collision.

Figure 8:
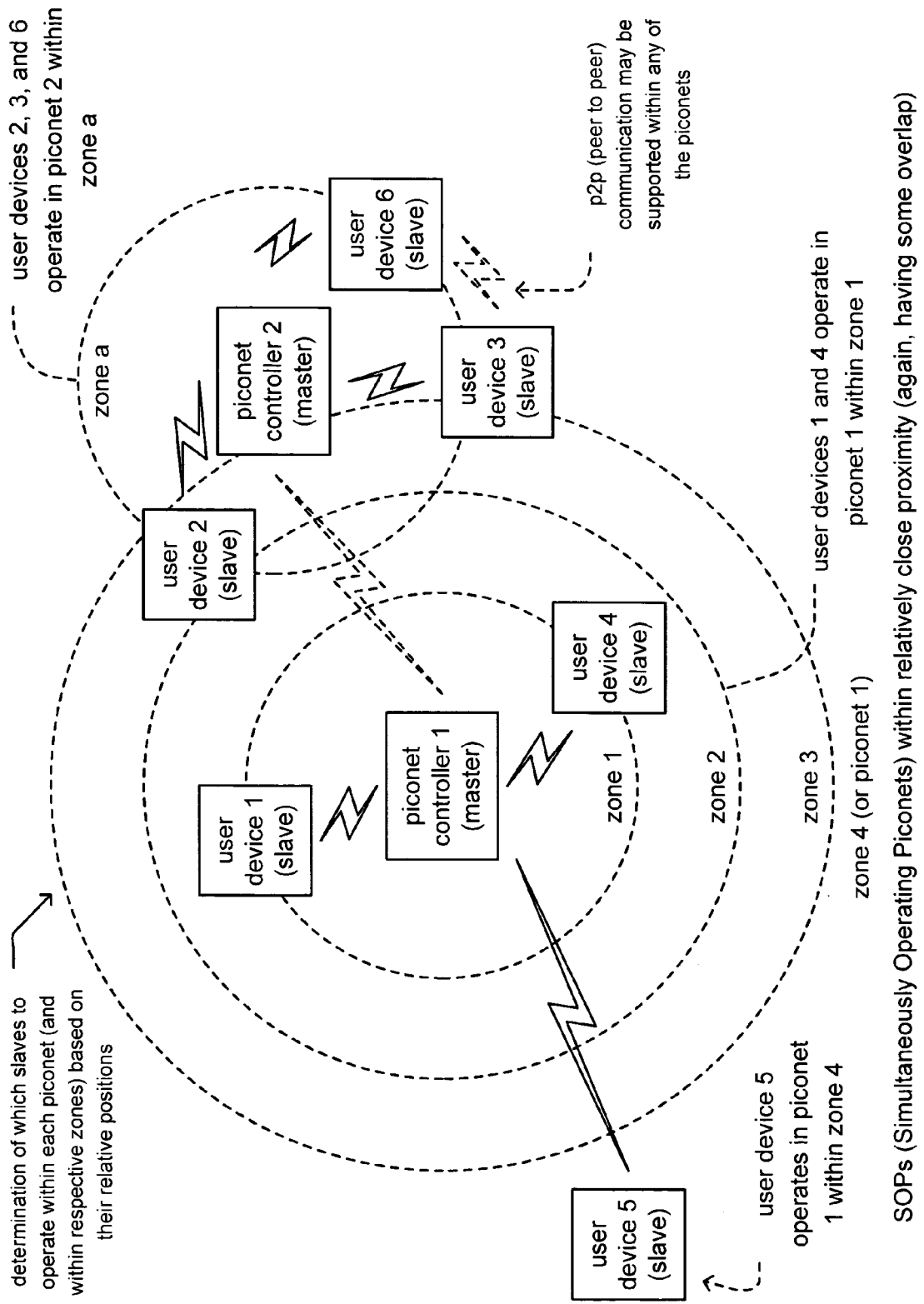
FIG. 8 is a diagram illustrating another embodiment of SOPs within relatively close proximity to one another (having some overlap) according to the invention.

FIG. 8 is a diagram illustrating another embodiment of SOPs within relatively close proximity to one another (having some overlap) according to the invention. However, in contradistinction to the embodiment described above, this embodiment shows how different time-frequency codes may be implemented even within a given piconet. This may be performed in addition to (e.g., in conjunction with) the different time-frequency codes being implemented for different piconets.

This embodiment shows a number of user devices (slaves) and 2 piconet controllers (masters) within a region. If desired, the locations of the various devices within this region may be ascertained using any number of means. In one such embodiment, both of the piconet controllers 1 & 2 (masters) are operable to perform ranging of all of the user devices (slaves) within the region. Together, the piconet controller (master) 1 and the piconet controller (master) 2 perform this ranging of all of the user devices (slaves), group them accordingly, an also select the appropriate time-frequency codes that are used to govern the communication between the user devices (slaves) and the piconet controllers 1 & 2 (masters). In addition, one or both of the piconet controllers 1 & 2 (masters) may also direct 2 or more of the user devices (slaves) to perform p2p communication between them and perform ranging of the relative distances between them; this information may then be provided to both of the piconet controllers 1 & 2 (masters). In doing so, triangulation may be performed by one or both of the piconet controllers 1 & 2 (masters) to determine the precise location of the user devices (slaves) within the region.

The distribution of the user devices (slaves) in this embodiment is such that the user devices (slaves) may appropriately be grouped to operate with one particular piconet controller (master) within the region. For example, those user devices (slaves) closer in vicinity to the piconet controller 2 (master) may be grouped within one group; that is to say, user devices 2, 3, & 6 (slaves) may be grouped within a zone whose communication is governed according to one time-frequency code in one piconet (e.g., piconet 2).

Similarly, the piconet controller 1 (master) services the other user devices 1 & 4 (slaves) (within a zone 1 using another time-frequency code), and the piconet controller 1 (master) services user device 5 (slave) (as being outside a zone 3 using yet another time-frequency code). These user devices (slaves) and the piconet controller 1 (master) may be viewed as being another piconet (e.g., piconet 1).

Alternatively, the communication between the various groups of user devices (slaves) and their respective piconet controller (master) may be governed using different profiles. Each of these profiles may include information corresponding to the time-frequency code employed, the rate of frequency hopping, and/or the PRF that governs the communication of those devices (among other operational parameters). Generally speaking, this embodiment shows how the communication between various devices may not only be implemented differently within different piconets, but also may be implemented differently between various devices within a given piconet.

Figure 9:
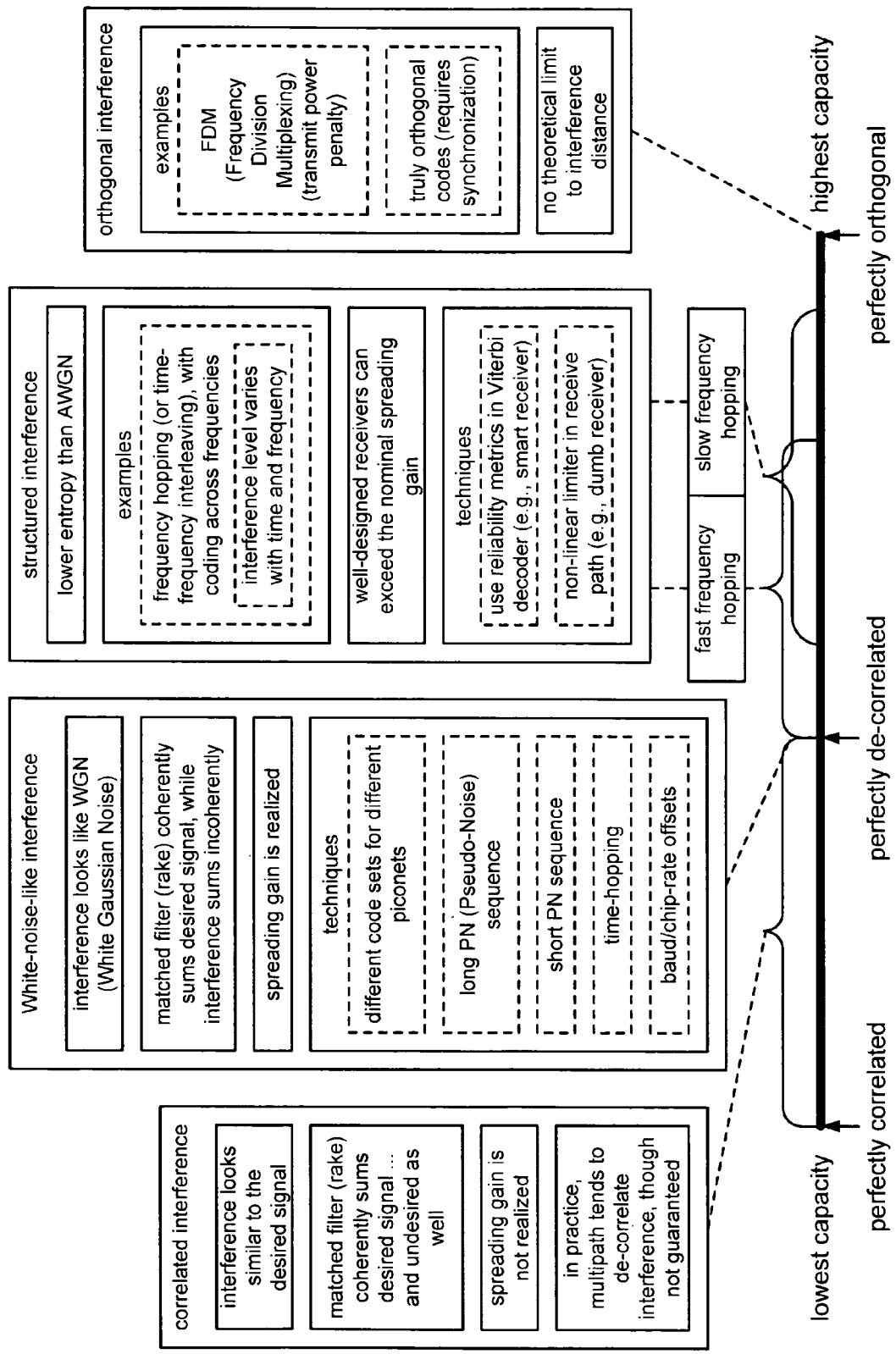
FIG. 9 is a diagram illustrating an embodiment of SOPs interference characteristics according to the invention.

FIG. 9 is a diagram illustrating an embodiment of SOPs interference characteristics according to the invention. The interference regions are shown in this diagram for many different ways of implementing SOPs. A spectrum of lowest capacity of a piconet communication system ranging to a highest capacity is shown for various manners in which a piconet communication system may be operated. At the lowest capacity end of the spectrum, the interference is perfectly correlated. At the highest capacity end of the spectrum, the interference is perfectly orthogonal. In the interim, there is a region of the spectrum where the interference is perfectly de-correlated. This region may be characterized as unstructured interference. Moving towards the highest capacity portion of the spectrum, there is a portion of the spectrum where the interference may then be characterized as structured interference.

Starting at the low end of capacity, correlated interference may be characterized as interference that looks similar to the desired signal. To accommodate this type of interference, a matched filter (rake) may be implemented to coherently sum the desired signal. However, such a matched filter (rake) also coherently sums the undesired signal as well as the desired signal, and this typically requires more complex receiver processing. No spreading gain is realized in this type of situation. In practice, multipath typically tends to de-correlate interference, though it is not guaranteed.

Continuing up the spectrum towards the highest capacity end, White-noise-like interference may be characterized as interference that looks like WGN (White Gaussian Noise). A matched filter (rake) may be implemented that coherently sums the desired signal, while the interference is summed incoherently. For this type of interference, spreading gain is in fact realized. There are a variety of techniques in which this may be implemented. For example, different code sets may be implemented for different piconets. Alternatively, long PN (Pseudo-Noise) sequences (or short PN sequences) may be implemented. Time-hopping may alternatively be performed. In addition, baud/chip-rate offsets may be employed as well.

Within the context of structured interference, fast or slow frequency hopping may be performed. One embodiment of the invention includes employing combined SH-OFDM (Slow Hopping-Orthogonal Frequency Division Multiplexing) that inherently provides a structured type of interference that may be handled very effectively using a receiver with some embedded intelligence to accommodate any undesirable symbol collisions. One of the reasons that this structure type of interference offers benefits over the WGN (White Gaussian Noise) is that this type of structured interference has lower entropy than interference added via AWGN (Additive White Gaussian Noise). This lower entropy may be deduced when analyzing and comparing these types of interferences. One example that may be implemented to achieve this structured interference is frequency hopping (or time-frequency interleaving), with coding across frequencies. The interference level then varies with time and frequency. Well-designed receivers can exceed the nominal spreading gain that may be achieved using prior art receivers. In addition some techniques in which this may be achieved include using reliability metrics in a Viterbi decoder (e.g., a smart receiver having some embedded intelligence). Alternatively, a non-linear limiter may be implemented in a receive path (e.g., in a dumb receiver).

Moving to the right hand portion of the spectrum, orthogonal interference may be found that is perfectly orthogonal. Examples of means of operating a communication system to achieve this orthogonal interference FDM (Frequency Division Multiplexing) that does, however, incur a transmit power penalty. In addition, any truly orthogonal code does require synchronization for proper performance. The advantage of such orthogonal codes is that there exists no theoretical limit to the interference distance of interference that is generated by such codes.

Figure 10:
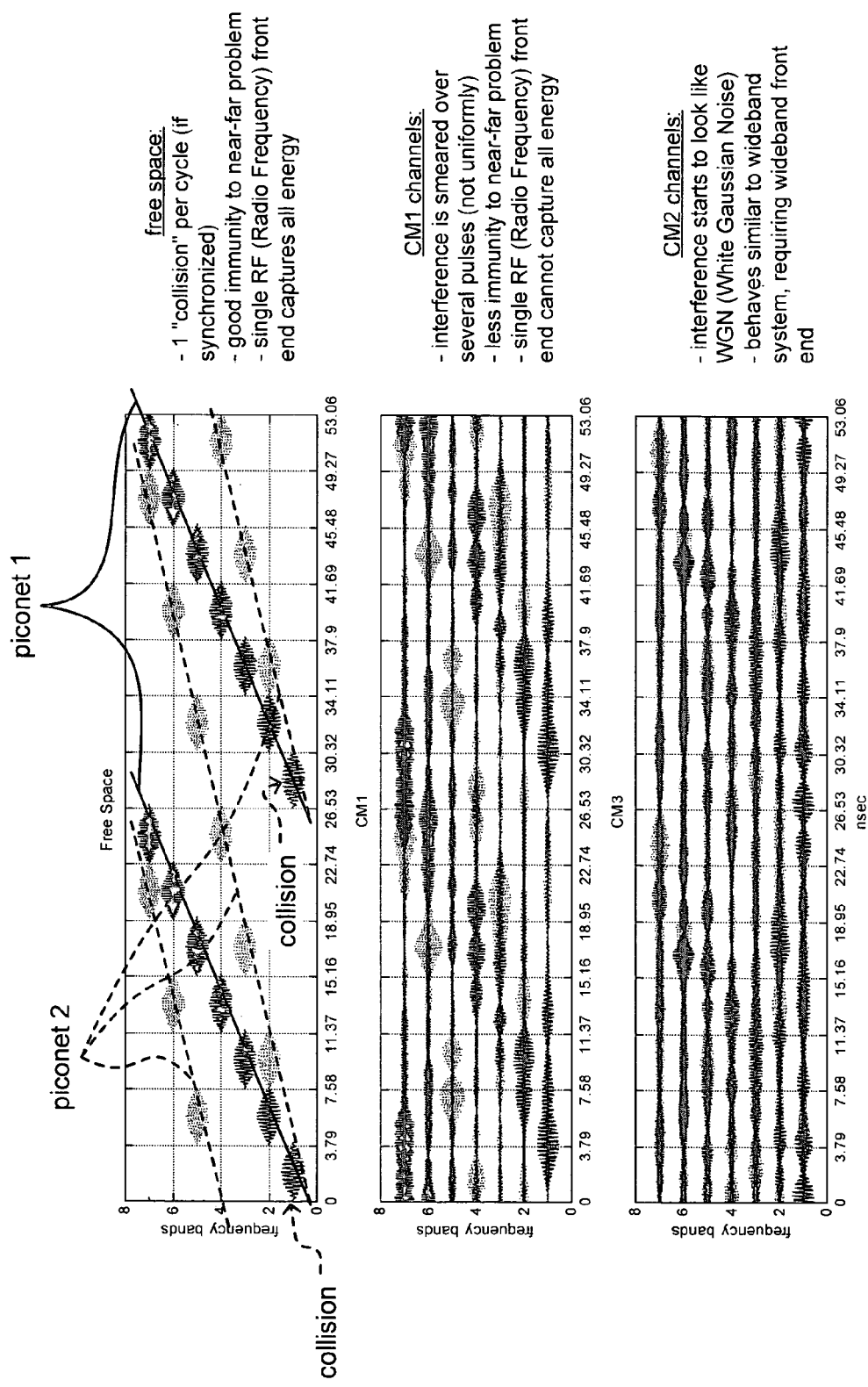
FIG. 10 is a diagram illustrating an embodiment of fast frequency hopping with multipath and interference according to the invention.

FIG. 10 is a diagram illustrating an embodiment of fast frequency hopping with multipath and interference according to the invention. This embodiment shows various time-frequency codes implemented within various piconets may suffer symbol collisions.

At the top of the diagram, free space communication of pulses is shown. As can be seen, 1 symbol "collision" will occur per cycle (if the time-frequency codes are synchronized with one another. This solution does provide good immunity to the near-far problem, and a single RF (Radio Frequency) front end may be implemented such that it captures all of the energy of the received pulses.

In the middle of the diagram, CM1 channels are shown where the interference is smeared over several pulses (and not uniformly). Unfortunately, this implementation presents less immunity to the near-far problem. Also unfortunately, a single RF (Radio Frequency) front end cannot capture all of the energy of received symbols.

At the bottom of the diagram, CM2 channels are shown where the interference starts to look like WGN (White Gaussian Noise). Such a communication channel may be referred to as an AWGN (Additive White Gaussian Noise) communication channel. This interference behaves more similar to that of a wideband system. Therefore, to accommodate such signaling, a wideband front end need be implemented.

These various types of interference, generated by SOPs show more clearly and how difficult effective receiver processing may be when trying to deal with interference that does not have a predictable and manageable structure. Various aspects of the invention show how structure (and therefore more manageable) interference may be generated by operating various SOPs in a particular manner. For example, when operating these SOPs using SH-OFDM (Slow Hopping-Orthogonal Frequency Division Multiplexing) combined with a reduced PRF (Pulse Repetition Frequency), when compared to prior art piconets, will allow for the intelligent managing of any symbol collisions.

Figure 11:
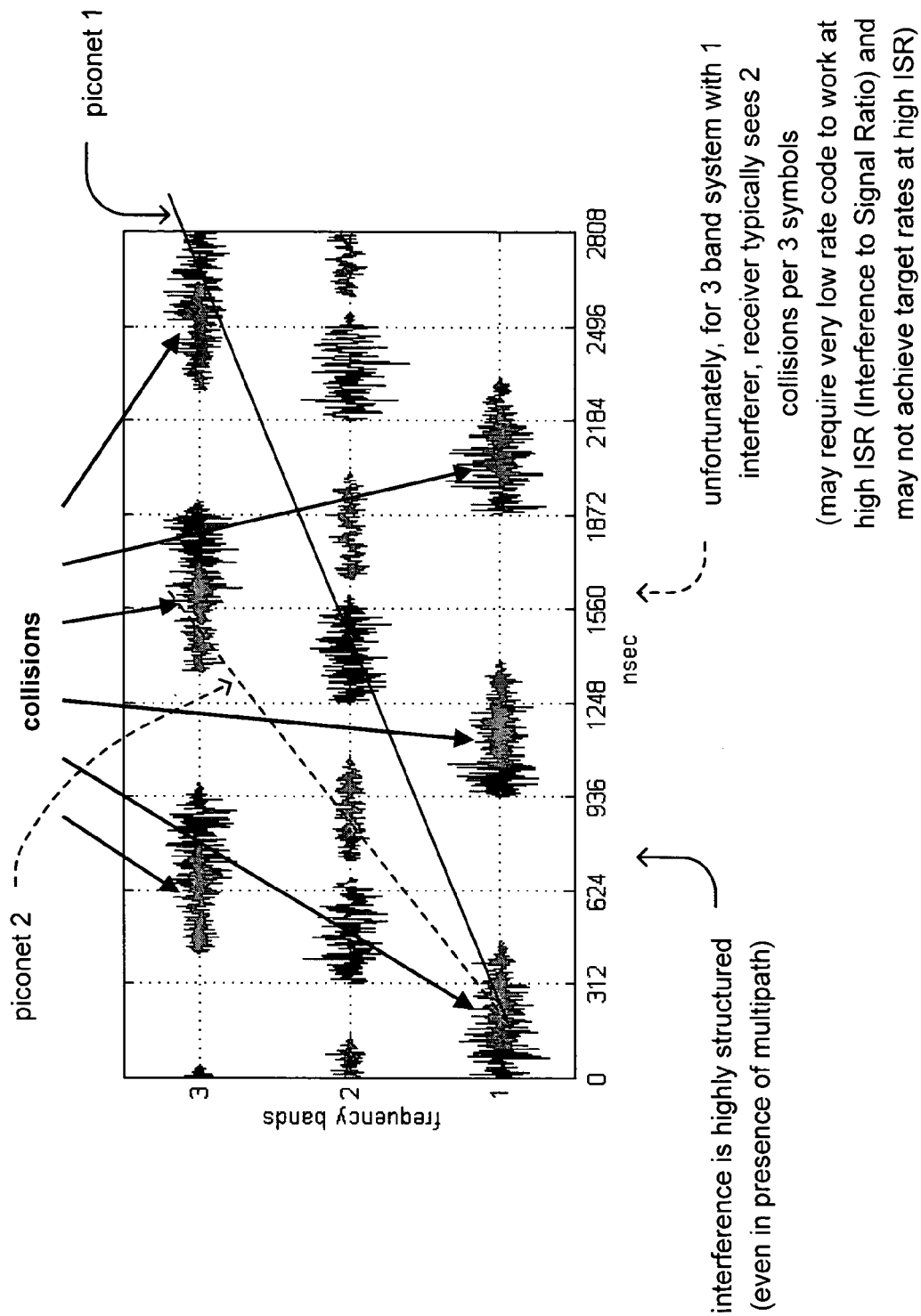
FIG. 11 is a diagram illustrating an embodiment of SH-OFDM (Slow-Hopping-Orthogonal Frequency Division Multiplexing) according to the invention.

FIG. 11 is a diagram illustrating an embodiment of SH-OFDM (Slow-Hopping-Orthogonal Frequency Division Multiplexing) according to the invention. Two (2) separate piconets (e.g., a piconet 1 and a piconet 2) each operate using different time-frequency codes, as can be seen where the frequency bands employed are changed as a function of time. During some instances, a common frequency band is employed by both piconets and undesirable symbol collisions may occur. One such effect is that, when a symbol collision occurs, the energy of such a "symbol" (really a symbol-collision-modified-symbol) will incur a greater amount of energy (or power).

However, one advantage of operating in such a way is that the interference in actually highly structured. This is true even in the presence of multipath effects within the piconets. There is a drawback, however, in that, unfortunately, for a 3 band system with 1 interferer, a receiver will typically see 2 collisions per 3 symbols. To compensate for this, the piconet may require a very low rate code to work at a high ISR (Interference to Signal Ratio). Moreover, the piconet may not achieve the target rates at the high ISR.

However, the fact that the interference is highly structure, even in the presence of multipath, does provide for some operational advantages. In accordance with the SH-OFDM, by dwelling longer on each frequency band, symbol collisions may be confined to a single frequency hop.

Figure 12:
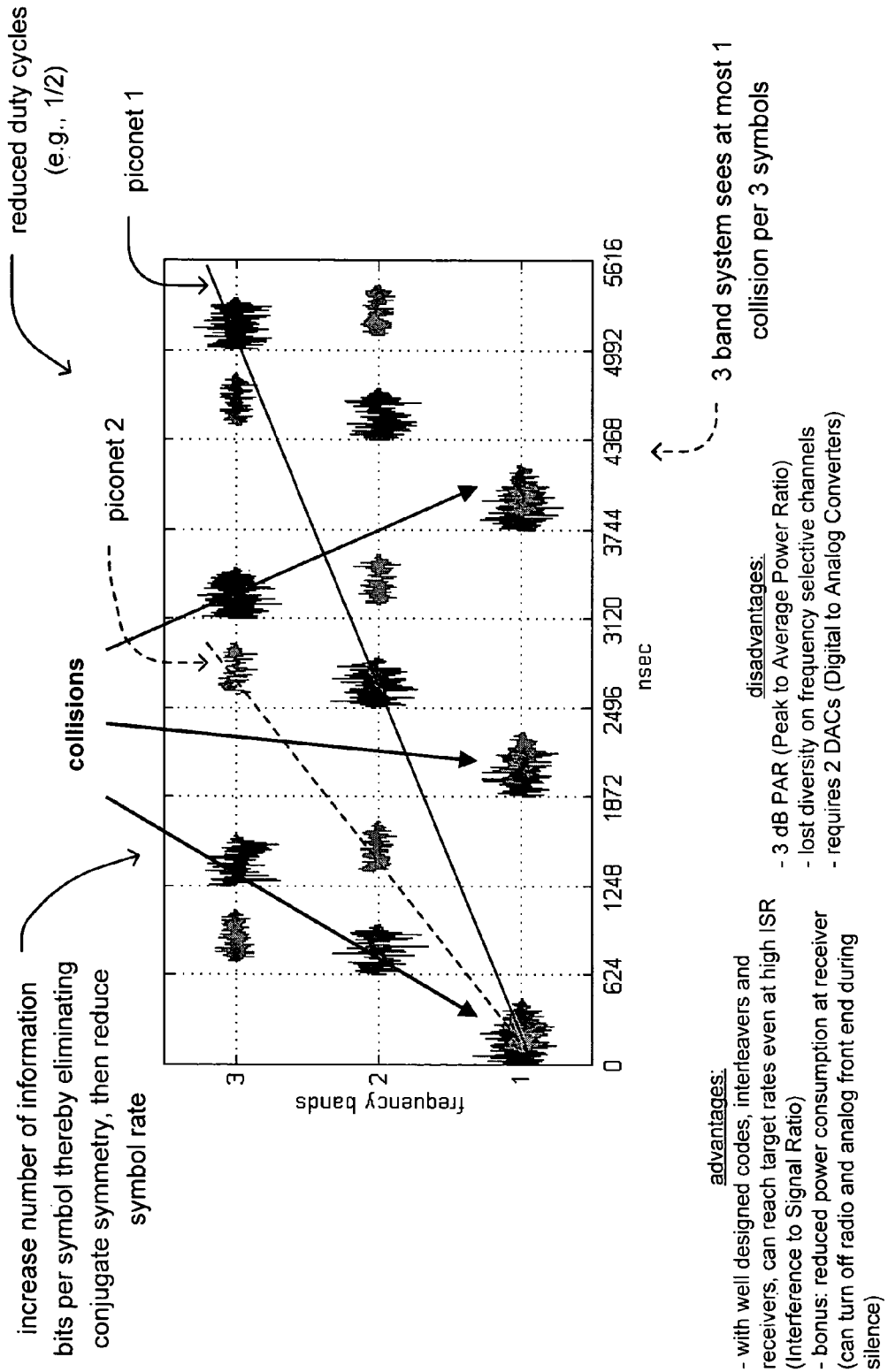
FIG. 12 is a diagram illustrating an embodiment of reduced duty cycle SH-OFDM according to the invention.

FIG. 12 is a diagram illustrating an embodiment of reduced duty cycle SH-OFDM according to the invention. This diagram shows an alternative embodiment where the number of information bits is increased per symbol thereby eliminating the conjugate symmetry; then the symbol rate is reduced.

Again, as with the embodiment shown above, two (2) separate piconets (e.g., a piconet 1 and a piconet 2) each operate using different time-frequency codes, as can be seen where the frequency bands employed are changed as a function of time. During some instances, a common frequency band is employed by both piconets and undesirable symbol collisions may occur. One such effect is that, when a symbol collision occurs, the energy of such a "symbol" (really a symbol-collision-modified-symbol) will incur a greater amount of energy (or power).

Within such an embodiment, a 3 band system will see at most 1 collision per 3 symbols. This is a large improvement over the 2 collisions per 3 symbols as shown within the above embodiment that does not employ the reduced duty cycle when modulating the symbols transmitted therein. In some instances, the duty cycle employed when performing the modulation is a duty cycle of ½.

Some of the advantages of such a system, implemented using well designed codes, include the fact that such a system can reach the target rates even at high ISR (Interference to Signal Ratio). In addition, there is bonus of such a system, in that, reduced power consumption may be supported at the receiver. The receiver can turn off its radio and analog front end during silence periods.

However, such a system may be viewed as having some disadvantages. For example, some of the disadvantages of such a system may be characterized to include a 3 dB PAR (Peak to Average Power Ratio) limitation. In addition, there is lost diversity on the frequency selective channels, and the implementation of such a system requires 2 separate DACs (Digital to Analog Converters).

However, the advantages of such a system nevertheless do provide an advantage over the prior art.

Figure 13:
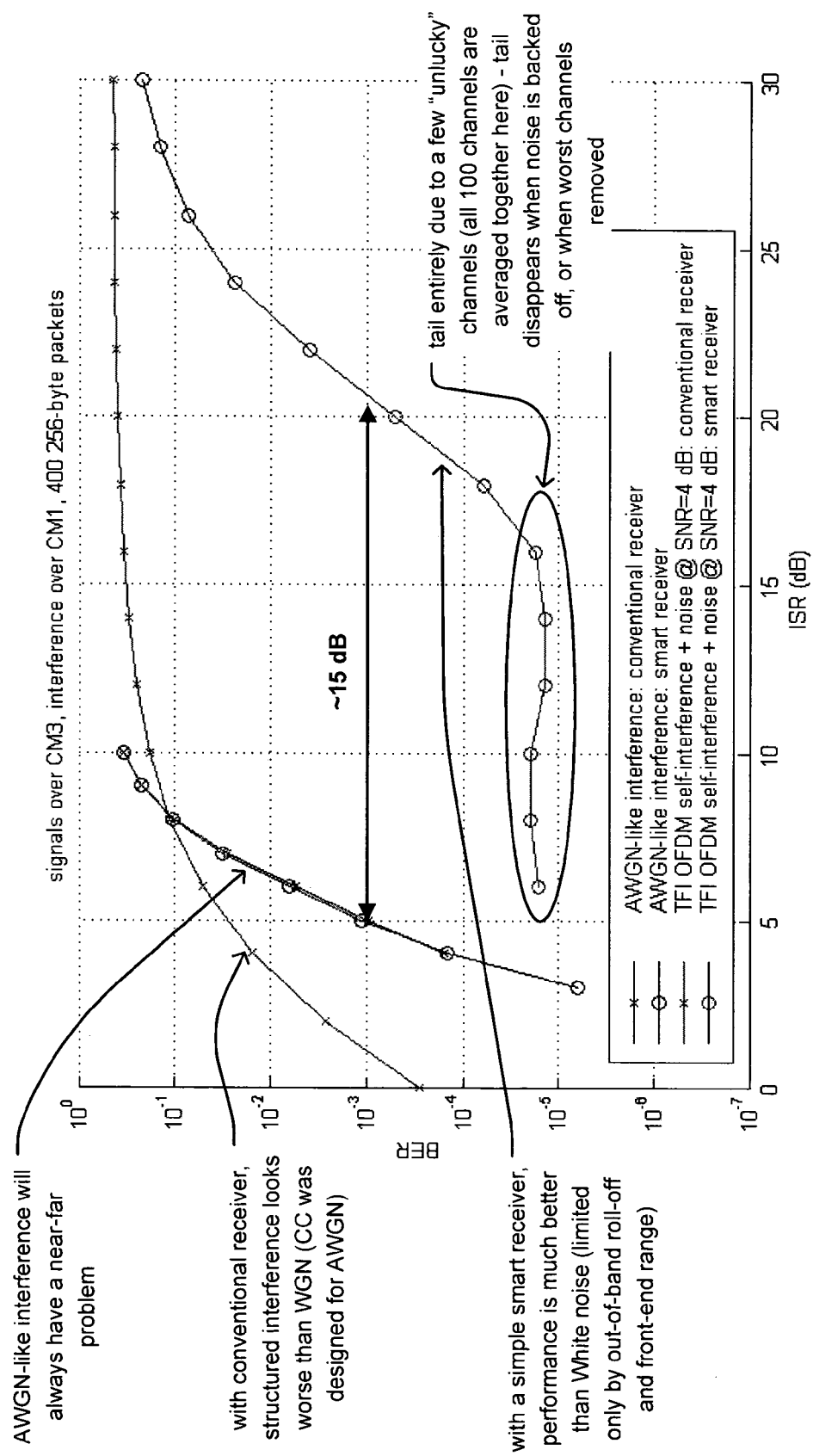
FIG. 13 is a diagram illustrating an embodiment of a 3 band simulation result (simulation 1) that is made according to the invention.
Figure 14:
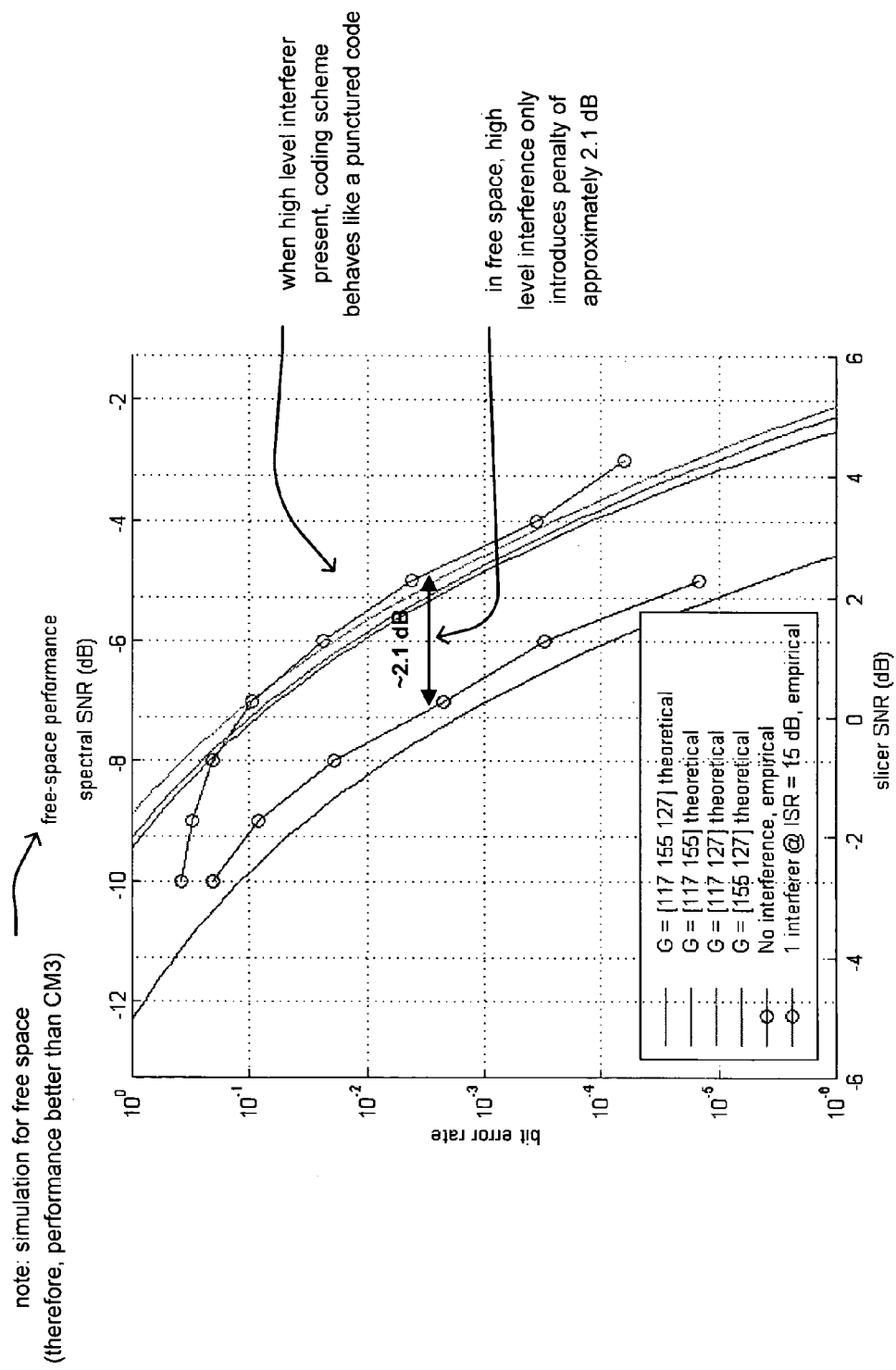
FIG. 14 is a diagram illustrating another embodiment of a 3 band simulation result (simulation 2) that is made according to the invention where the ISR (Interference to Signal Ratio) is held constant but where the noise is varied.

FIG. 13 and FIG. 14 are diagrams illustrating embodiment of 3 band simulation result that is made according to the invention.

These simulations are made using a certain operational parameters that are enumerated below:

Modulation Parameters
3 bands (fc=3.432 GHz, 3.960 GHz, 4.488 GHz)
128 tones per band
100 information tones per band
subcarrier spacing=528 MHz/128
16-sample cyclic prefix (30.3 nsec)
½ duty cycle
QPSK (Quadrature Phase Shift Key)
rate ⅓ 64-state convolutional code G=[117, 155, 127]8
coded bits interleaved across tones and bands (details not shown). For the 3-band case, each CC output stream is mapped to a different band
Length 3 TFI (Time-Frequency Interleaving) pattern: signal [1 2 3], interference [1 3 2].
Derived Parameters
symbol length=(128+16)/(528 MHz)=272.7 nsec
hop length=272.7 nsec*2=545.5 nsec
TFI cycle length=3*2*272.7 nsec=1.636 msec
Bit Rate=100*2*(⅓)/(545.5 nsec)=122.2 Mbps
Simulation Details
one interferer
400 256-byte packets
signals over CM3 (cycled through all 100 channels in order)
interference over CM1 (one chosen randomly for each packet)

channels normalized to get desired ISR (no shadowing)
For interference simulations, we add AWGN 4 dB below the received signal PSD (~6 dB below sensitivity limit)
time-offsets between signal & interference randomly chosen for each packet
all results averaged together to compute BER (did not discard 10 worst channels)
LPF (Low Pass Filter): Transmitter & Receiver both use a $3^{rd}$ order elliptical filter (see appendix for response)
Other practical constraints (e.g. front-end range) not simulated
Channel Estimation & Timing Recovery not simulated (perfect channel estimate & timing assumed)

FIG. 13 is a diagram illustrating an embodiment of a 3 band simulation result (simulation 1) that is made according to the invention. This diagram shows the BER (Bit Error Rate) vs. the ISR (Interference to Signal Ratio) (in dB (decibels)) of various types of piconet communication systems.

As can be seen in the diagram as is understood via information theory, the AWGN-like interference will always have a near-far problem. With a conventional receiver being implemented, the structured interference looks worse than simply WGN (White Gaussian Noise) (it is noted that CC (Chip on Chip) was designed for AWGN).

However, what is notable in this diagram is that, by capitalizing on the structured interference that is generated by operating the SOPs is this particular manner, and with a simple smart receiver (with some embedded intelligence to compensate for the symbol collisions), the performance of such a system is much better than a system that operates in the existent of White noise. Again, this capitalizing may be viewed as performing intelligent receiver processing in such a way as to operate on the structured type of interference that may be existent in the received signal so as to provide for improved performance. This may be viewed as being performed in such a way that receiver processing is performed in such a way to include selective interference compensation of a symbol by selectively de-weighting the symbol based on structured interference existent therein. This selective de-weighting of the symbol may include performing no de-weighting in some instances while performing some de-weighting in other instances. The performance of such a system is limited only by out-of-band roll-off and front-end range of the radio front end/filtering employed within the receive paths of a piconet operable device that is designed in accordance with invention.

It is also noted that the undesirable performance "tail" of the structured interference embodiment (employing the smart receiver) is entirely due to a few "unlucky" channels (all 100 channels are averaged together here). It is moreover noted that this "tail" disappears when the noise is backed off, or when the worst channels are removed (which could be done in an implemented piconet operable device as desired).

FIG. 14 is a diagram illustrating another embodiment of a 3 band simulation result (simulation 2) that is made according to the invention where the ISR (Interference to Signal Ratio) is held constant but where the noise is varied. This diagram shows the BER (Bit Error Rate) vs. the ISR (Interference to Signal Ratio) (in dB) of various types of piconet communication systems.

Again, the ISR is held constant for this simulation 2, and the noise is varied. It is also noted here that the simulation is for free space, and therefore, the performance is better than CM3. What is perhaps most striking in this simulation 2 is that when a high level interferer present, the coding scheme behaves like a punctured code. Such performance is predictable and easy to analyze. In such implementations, it is important to choose a code that performs well for all possible puncturing patterns that symbol collisions can cause. As one example of a code not to choose, G=[133 145 175] and for G'=[145 175] is a catastrophic code. In short, a proper design and selection of an appropriate code needs to be performed.

Another observation of this simulation 2 that is so promising is the fact that, in free space, high level interference only introduces a penalty of approximately 2.1 dB. This is extremely promising for future implementation of piconets operating according to the invention.

With respect to these 3 band simulations of 2 SOPs, it is noted that such the operation according to the invention can theoretically eliminate the near-far problem. The simulated system is also limited by the small total bandwidth available. For example, when operating at 22 Mbps, only 2 SOPs can co-exist within relatively close proximity to one another.

Increasing the number of closely operating SOPs requires increasing the total bandwidth available or decreasing the operational data rates. In short, to increase the data rate in a 2 SOP environment, it would require either a higher SNR (Signal to Noise Ratio) and a higher rate code or increasing the total bandwidth of the system.

Figure 15:
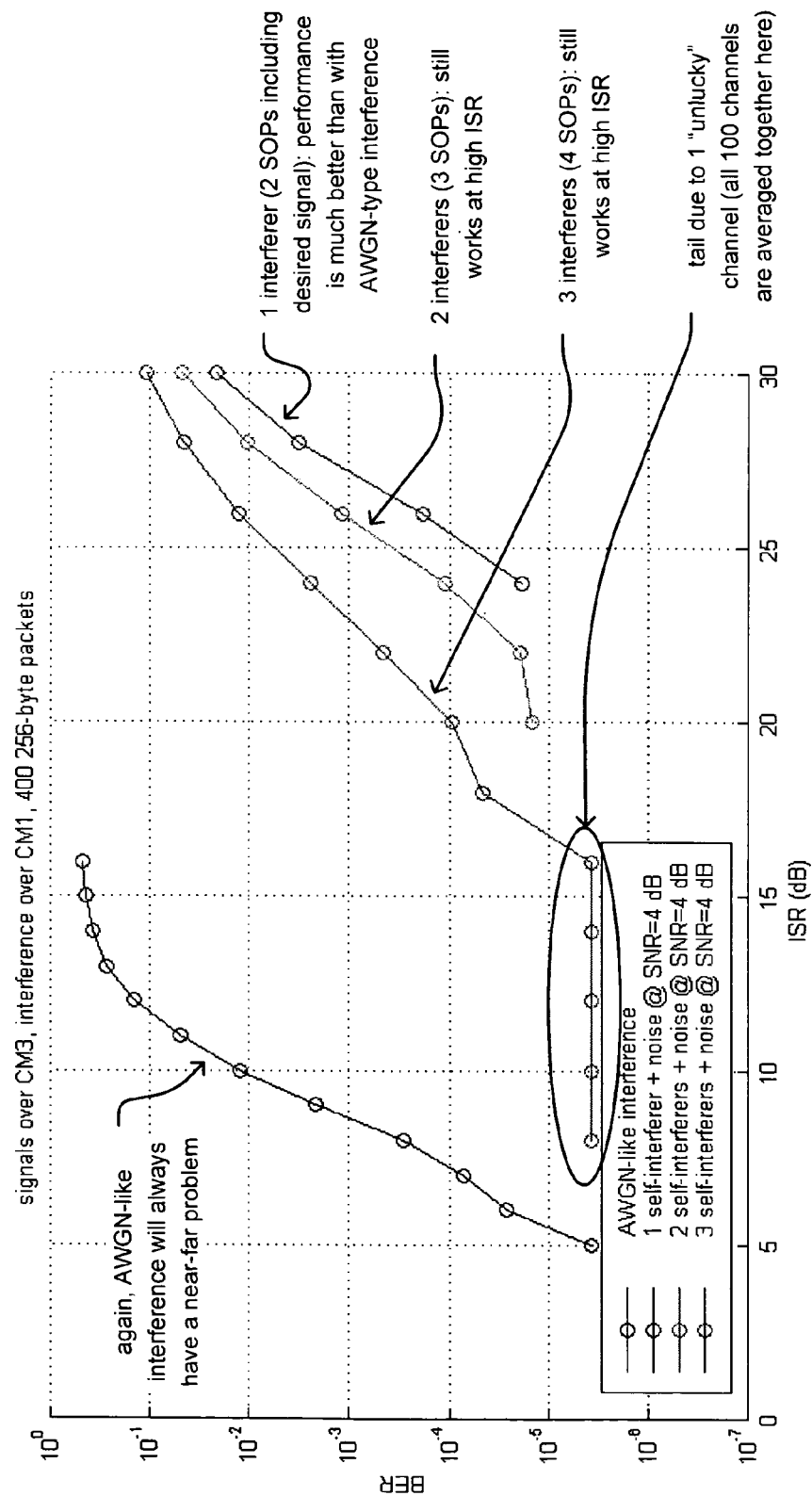
FIG. 15 is a diagram illustrating an embodiment of a 7 band simulation result that is made according to the invention.

FIG. 15 is a diagram illustrating an embodiment of a 7 band simulation result that is made according to the invention. This diagram shows the BER (Bit Error Rate) vs. the ISR (Interference to Signal Ratio) (in dB) of various types of piconet communication systems.

This simulation is made using certain operational parameters that are enumerated below:

Modulation Parameters
7 bands (fc=3.432, 3.960, 4.488, 5.016, 5.544, 6.072, 6.600 GHz)
128 tones per band
100 information tones per band
subcarrier spacing=528 MHz/128
16-sample cyclic prefix (30.3 nsec)
½ duty cycle
QPSK
rate ⅓ 64-state convolutional code G=[117, 155, 127]8
coded bits interleaved across tones and bands (details not shown). For the 7-band case, we made no attempt to associate bands with CC output streams
Length-7 TFI patterns
Derived Parameters
symbol length=(128+16)/(528 MHz)=272.7 nsec
hop length=272.7 nsec*2=545.5 nsec
TFI cycle length=7*2*272.7 nsec=3.818 msec
Bit Rate=100*2*(⅓)/(545.5 nsec)=122.2 Mbps
Simulation Details
one, two, and three interferers
400 256-byte packets
signals over CM3 (cycled through all 100 channels in order)
interference over CM1 (chosen randomly for each packet)
channels normalized to get desired ISR (no shadowing)
For interference simulations, we add AWGN 4 dB below the received signal PSD (~10 dB below sensitivity limit)
time-offsets between signal & interference randomly chosen for each interferer for each packet
all results averaged together to compute BER (did not discard 10 worst channels)
LPF: Transmitter & Receiver both use a 3rd order elliptical filter (see appendix for response)

Other practical constraints (e.g. front-end range) not simulated

Channel Estimation & Timing Recovery not simulated (perfect channel estimate & timing assumed)

Again, as can be seen in this diagram and as is understood via information theory, AWGN-like interference will always have a near-far problem.

However, very promising performance is achieved. For example, with 1 interferer (2 SOPs including desired signal), performance is much better than with AWGN-type interference. Even with 2 interferers (3 SOPs), this approach still works very well at high ISR. And even more promising is the fact even with 3 interferers (4 SOPs), this approach still works very well at high ISR.

It is also noted that the tail of the 3 interferers (4 SOPs) is due to 1 "unlucky" channel (all 100 channels are averaged together here).

Several observations may be made with respect to the 7 band simulations. For example, the 7 band solution presented by the invention appears to support 4 SOPs with much better performance than any current proposal within the IEEE 802.15 working groups. The simulations have shown that 4 overlapping SOPs may be supported while operating at a rate of 122 Mbps, with a SNR=4 dB, and an ISR~=16 dB.

It is noted, however, that the noise of these simulations is 10 dB (i.e., not 6 dB) below the sensitivity limit. As opposed to 4 overlapping SOPs, 2 overlapping SOPs should allow much higher rates.

In addition, several general comments may be made for systems employing the invention. Well-designed hopping patterns, codes, and interleavers are required to achieve the theoretical benefits of structured interference. Again, the performance will be limited by filter roll-off and front-end range. Moreover, interfering piconets don't have to be "coordinated," but they do have to be well-behaved. The various aspects of the invention work best if all of the piconets use a low duty-cycle when they sense other close piconets (e.g., when they operate in relatively close proximity to other piconets).

In general, low duty cycle MB-OFDM shows a great deal of promise for vastly improving the performance of SOPs. For example, these simulations have shown that a 3 band mode supports 2 overlapping SOPs@122 Mbps, and a 7 band mode supports 4 overlapping SOPs@122 Mbps. Moreover, the performance of these systems could be improved by optimizing the code, interleaver, and modulation parameters employed within these systems as well.

Figure 16:
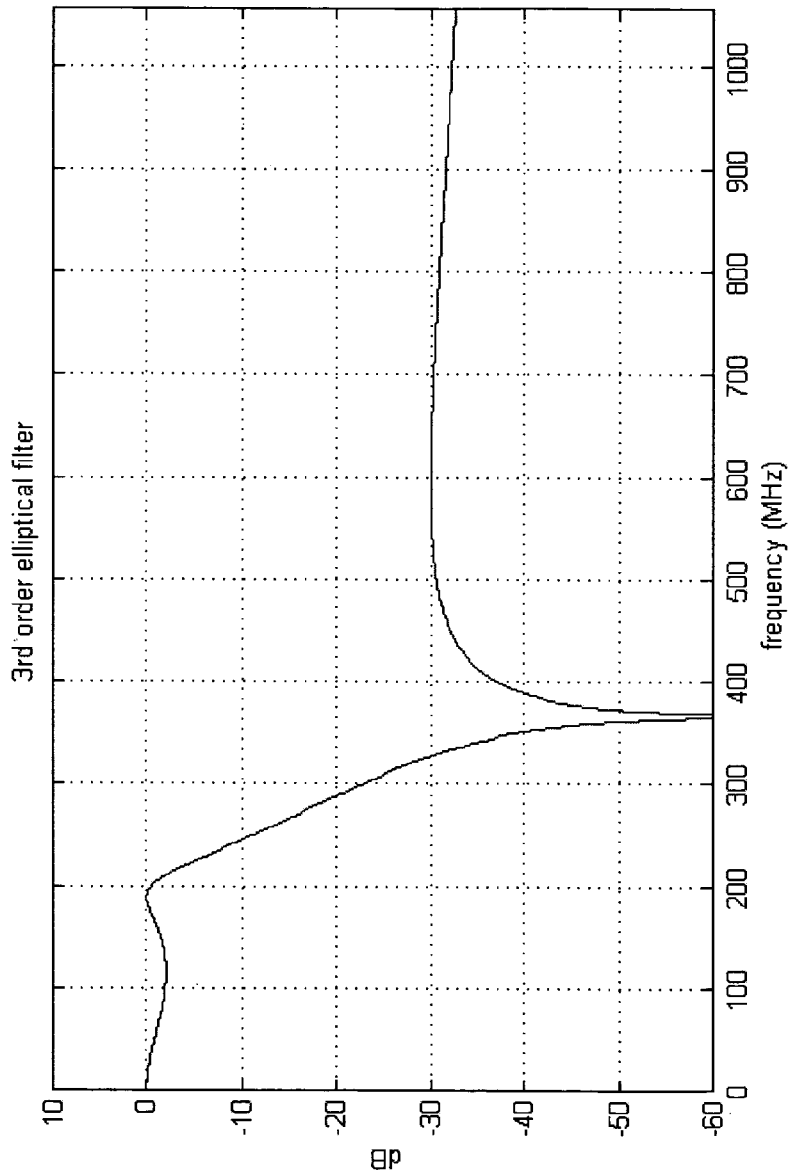
FIG. 16 is a diagram illustrating an embodiment of a $3^{rd}$ order elliptical LPF (Low Pass Filter) employed at a transmitter and a receiver (or a transceiver) according to the invention.

FIG. 16 is a diagram illustrating an embodiment of a $3^{rd}$ order elliptical LPF (Low Pass Filter) employed at a transmitter and a receiver (or a transceiver) according to the invention. Above, it is noted that the performance of a piconet operating according to the invention will typically be limited only by the out of band roll off and front end range (e.g., the radio front end and the filtering performed therein) of a device operating within such a piconet. That is to say, the filter shape largely determines the degree of interference rejection. Higher-order filters could substantially increase the ISR range of such a system.

The LPF shown in this diagram was employed. It is however noted that even better filters that may be designed can be implemented to provide for even better performance.

Figure 17:
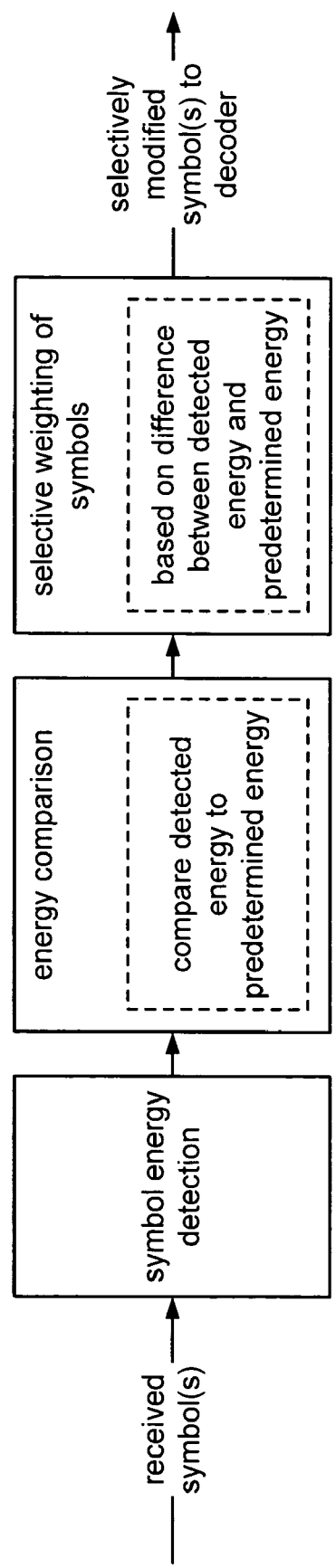
FIG. 17 is a diagram illustrating an embodiment of functionality of interference compensation capitalizing on structured interference according to the invention.

FIG. 17 is a diagram illustrating an embodiment of functionality of interference compensation capitalizing on structured interference according to the invention. One or more symbols are received by this functionality. A symbol energy detection functional block is operable to perform detection of the energy of received symbols.

After the symbol energy detection functional block performs the detection of the energy of a received symbol, an energy comparison functional block is operable to perform comparison of the detected energy to a predetermined energy. This predetermined energy may be viewed as an expected energy at which the received symbols should be at.

When a difference between the detected of the symbol exceeds a threshold (that may be programmable or adaptively determined), then this interference compensation functionality includes a functional block that is operable to perform selective weighting (as necessary) of symbols. This may be performed based on the difference between the detected energy and the predetermined energy. For example, when the energy is greater than the predetermined energy by a particular threshold, then that may be used to indicate a high likelihood of a symbol collision, and that symbol may be de-weighted before performing decoding processing of the symbol (e.g., in a decoder—one embodiment of which is a Viterbi decoder).

After the functionality of this diagram has been performed, then the selectively modified symbol(s) are provided to a decoder for making best estimates of the bits of the received symbols. By selective modification, it is noted that some of the symbols will not undergo any de-weighting, but rather be passed to the decoder without any modification at all.

Figure 18:
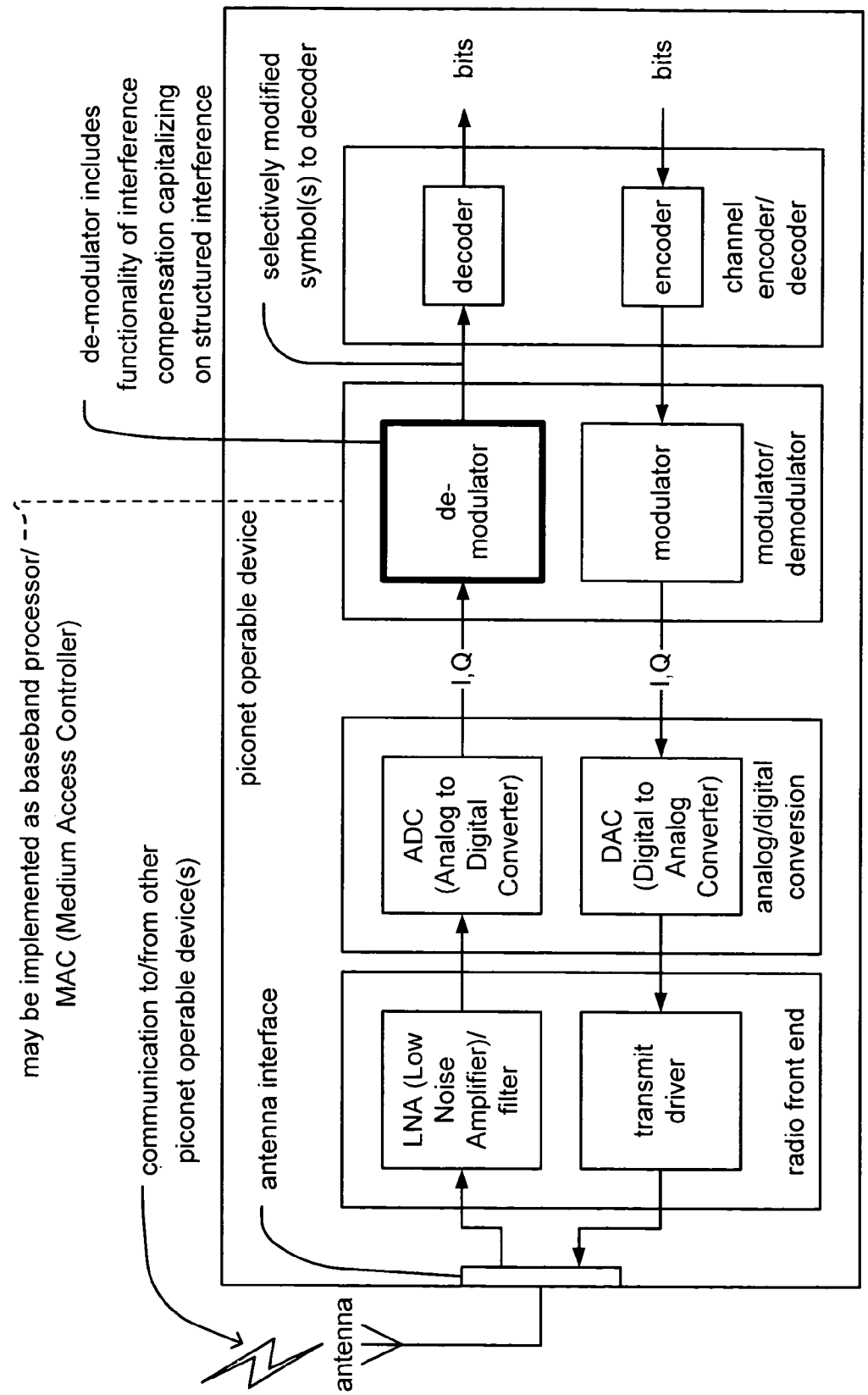
FIG. 18 is a diagram illustrating an embodiment of a piconet operable device that supports functionality of interference compensation capitalizing on structured interference according to the invention.

FIG. 18 is a diagram illustrating an embodiment of a piconet operable device that supports functionality of interference compensation capitalizing on structured interference according to the invention.

This embodiment of a piconet operable device includes an antenna that is operable to communicate with any 1 or more other piconet operable devices within the piconet. An antenna interface communicatively couples a signal to be transmitted from the piconet operable device or a signal received by the piconet operable device to the appropriate path (be it the transmit path or the receive path).

A radio front end includes receiver functionality and transmitter functionality. The radio front end communicatively couples to an analog/digital conversion functional block. The radio front end communicatively couples to a modulator/demodulator, and the radio front end communicatively couples to a channel encoder/decoder.

Along the Receive Path:

The receiver functionality of the radio front end includes a LNA (Low Noise Amplifier)/filter. The filtering performed in this receiver functionality may be viewed as the filtering that is limiting to the performance of the device, as also described above. The receiver functionality of the front end receives a continuous time signal and performs any appropriate filtering thereof. In addition, receiver functionality of the front end then performs any down-converting that may be requiring (which may alternatively include down-converting directing from the received signal to a baseband signal). Whichever manner is employed, a baseband signal is output from the receiver functionality of the front end and provided to an ADC (Analog to Digital Converter) that samples the continuous time signal and generates a discrete time signal. The ADC also extracts the I, Q (In-phase, Quadrature) components of this discrete time signal/baseband signal (e.g., a sequence of I, Q components of the discrete time modulation symbols).

These I, Q components are provided to a demodulator portion of the modulator/demodulator where any modulation decoding/symbol mapping is performed according to an appropriate modulation (that includes a constellation and corresponding mapping) to generate a sequence of discrete-valued modulation symbols. Examples of such modulations may include BPSK (Binary Phase Shift Key), QPSK (Quadrature Phase Shift Key), 8 PSK (8 Phase Shift Key), 16 QAM (16 Quadrature Amplitude Modulation), and even higher order modulation types. In this demodulator portion of the modulator/demodulator, embedded intelligence is included to support the functionality of the interference compensation described within other of the various embodiments. For example, this may include selectively de-weighting those symbols that have undergone a symbol collision. This interference compensation may be performed by capitalizing in the inherent properties of the structured interference supported by operating the piconet in a manner according to the invention. These selectively modified symbols are then provided to a decoder portion of the channel encoder/decoder where best estimates of the information bits contained within the received symbols are made.

Along the Transmit Path:

Somewhat analogous and opposite processing is performed in the transmit path when compared to the receive path. Information bits that are to be transmitted are encoded using an encoder of the channel encoder/decoder. These encoded bits are provided to a modulator of the modulator/demodulator where modulation encoding/symbol mapping may be performed according to the modulation of interest. These now I, Q components of the symbols are then passed to a DAC (Digital to Analog Converter) of the analog/digital conversion functional block to generate a continuous time transmit signal. The now analog signal to be transmitted (e.g., the continuous time transmit signal) is then passed to a transmit driver that performs any necessary up-converting/modification (e.g., including filtering) to the continuous time transmit signal to comport it to the communication channel over which the signal is to be transmitted to another piconet operable device via the antenna.

FIG. 19 is a diagram illustrating another embodiment of a piconet operable device that supports functionality of interference compensation capitalizing on structured interference (showing PHY (physical layer), MAC (Medium Access Controller), and higher protocol layers) according to the invention. A piconet operable device is included within a piconet. This piconet operable device includes a PHY (physical layer) that communicatively couples to a MAC (Medium Access Controller). The MACs of the devices may also communicatively couple to 1 or more even higher application layers within the piconet operable device. The MAC and the higher application layers may be viewed as being the higher protocol layers (e.g., above the PHY) within the respective piconet operable device. The PHY is operable to support a PHY link to 1 or more other devices within a piconet.

When compared to a prior art MAC, the MAC of the piconet operable device may be viewed as being a modified protocol layer, in that, the MAC includes functionality to perform interference compensation that capitalizes on the properties of the structured interference that may result from symbol collisions when operating using the combination of SH-OFDM and reduced PRF when compared to prior art piconet systems.

This interference compensation functionality is operable to perform symbol energy detection of symbols received by the piconet operable device. After performing the detection of the energy of a received symbol, the detected energy is compared to a predetermined energy. When a difference between the detected of the symbol exceeds a threshold (that may be programmable or adaptively determined), then this interference compensation functionality may then perform selective weighting of symbol. In one example, when the detected energy of the symbol exceeds a predetermined threshold (e.g., when the detected energy of the symbol is greater than the predetermined energy by the threshold) then the symbol is appropriately de-weighted before being passed to a decoder for decoding processing.

FIG. 20 is a flowchart illustrating an embodiment of a method for operating a piconet operable device according to the invention. The method involves receiving a signal. Then, the method involves detecting an energy (or a power) of 1 or more symbol(s) within signal. Then, the method involves comparing the energy (or the power) of 1 or more symbol(s) to a predetermined (or an expected) energy (or power).

Then, a decision is made. It is then determined whether the energy (or the power) of the 1 or more symbol(s) is greater than the predetermined (or the expected) energy (or power). A threshold may be used to make this comparison, and the threshold may be programmable or adaptive (e.g., based on operating conditions or some other operational parameter).

If the energy (or the power) of the 1 or more symbol(s) is greater than the predetermined (or the expected) energy (or power), then this is indicative of a likely symbol collision. The symbol's energy (or power) is appropriately de-weighted, and that de-weighted symbol is then provided to a decoder for decoder processing. However, if the energy (or the power) of the 1 or more symbol(s) is not greater than the predetermined (or the expected) energy (or power), then the method involves providing the symbol(s) to decoder for decoder processing.

This providing of the either the de-weighted symbols or the un-modified symbols to the decoder for decoder processing may be viewed as being providing selectively weighted symbol(s) to decoder. That is to say, some of the symbols are de-weighted and some are not (hence, the term selectively de-weighted symbols. The method then involves decoding the de-weighted symbol or the unmodified symbol to make best estimates of at least one information bit contained within the originally received symbol.

It is also noted that the method described here within the FIG. 20 may also be performed within the appropriate device and/or system embodiments described within other portions of this specification.

In view of the above detailed description of the invention and associated drawings, other modifications and variations will now become apparent. It should also be apparent that such other modifications and variations may be effected without departing from the spirit and scope of the invention.

What is claimed is:

1. A method for operating a piconet operable device, the method comprising:

receiving a signal that includes a first symbol;

detecting an energy of the first symbol;

comparing the energy of the first symbol to a predetermined energy;

determining whether a difference between the energy of the first symbol and the predetermined energy exceeds a threshold;

when the difference exceeds the threshold, appropriately de-weighting the first symbol using a predetermined de-weighting factor and providing the de-weighted first symbol to a decoder; and when the difference does not exceed the threshold, providing the unmodified first symbol to the decoder; and wherein:

the piconet operable device operates within a first piconet;

before being received by the piconet operable device, the first symbol collides with a second symbol transmitted within a second piconet; and at least one of the first symbol and the second symbol is modulated using a frequency hopping time-frequency code sequence that employs a duty cycle of approximately one-half.

2. The method of claim 1, wherein:

the piconet operable device is a first piconet operable device that operates within the first piconet that substantially occupies a first region;

a second piconet operable device operates within the second piconet that substantially occupies a second region; and the first region and the second region occupy at least a portion of common space.

3. The method of claim 2, wherein:

collisions between symbols within the first piconet and symbols within the second piconet occur according to a structured interference pattern.

4. The method of claim 2, wherein:

the first symbol collides with the second symbol that is received by the second piconet operable device before the first symbol is received by the first piconet operable device.

5. The method of claim 2, wherein:

the frequency hopping time-frequency code sequence is a first frequency hopping time-frequency code sequence;

the first symbol received by the first piconet operable device is a first OFDM (Orthogonal Frequency Division Multiplexing) symbol of a first plurality of OFDM symbols that is modulated according to the first frequency hopping time-frequency code sequence within the first piconet; and the second symbol received by the second piconet operable device is a second OFDM symbol of a second plurality of OFDM symbols that is modulated according to a second frequency hopping time-frequency code sequence within the second piconet.

6. The method of claim 5, wherein:

the first frequency hopping time-frequency code sequence employs a duty cycle of approximately one-half when modulating the first plurality of OFDM symbols; and the second frequency hopping time-frequency code sequence employs a duty cycle of approximately one-half when modulating the second plurality of OFDM symbols.

7. The method of claim 6, wherein:

the first frequency hopping time-frequency code sequence operates based on a three band system;

the second frequency hopping time-frequency code sequence operates based on a three band system; and a symbol collision occurs between the first piconet and the second piconet at most one time per three symbols.

8. The method of claim 1, further comprising:

modifying the threshold in real time based on a change in an operating condition of the first piconet in which the piconet operable device is situated.

9. The method of claim 1, wherein:

the threshold is a predetermined threshold that is programmed into the piconet operable device.

10. The method of claim 1, further comprising:

decoding the de-weighted first symbol or the unmodified first symbol to make a best estimate of at least one information bit contained therein.

11. A piconet operable device, the device comprising:

a radio front end that receives and filters a continuous time signal;

an ADC (Analog to Digital Converter) that samples the received and filtered continuous time signal thereby generating a discrete time signal and extracting I, Q (In-phase, Quadrature) components there from;

a demodulator that receives the I, Q components and performs symbol mapping of the I, Q components thereby generating a sequence of discrete-valued modulation symbols;

wherein the demodulator selectively performs interference compensation of a first symbol of the sequence of discrete-valued modulation symbols by selectively de-weighting the first symbol based on structured interference existent therein; and a decoder that receives the selectively interference compensated symbol and performs decoding thereof making a best estimate of at least one information bit contained therein; and wherein:

the piconet operable device operates within a first piconet;

before being received by the piconet operable device, the first symbol collides with a second symbol transmitted within a second piconet; and at least one of the first symbol and the second symbol is modulated using a frequency hopping time-frequency code sequence that employs a duty cycle of approximately one-half.

12. The device of claim 11, wherein:

the demodulator detects an energy of the first symbol of the sequence of discrete-valued modulation symbols;

the demodulator compares the energy of the first symbol to a predetermined energy;

the demodulator determines whether a difference between the energy of the first symbol and the predetermined energy exceeds a threshold;

when the difference exceeds the threshold, the demodulator appropriately de-weights the first symbol using a predetermined de-weighting factor thereby generating a de-weighted symbol;

when the difference does not exceed the threshold, the demodulator does not modify the first symbol; and the decoder decodes the de-weighted first symbol or the unmodified first symbol to make a best estimate of the at least one information bit contained therein.

13. The device of claim 12, wherein:

the demodulator modifies the threshold in real time based on a change in an operating condition of the first piconet in which the first piconet operable device is situated.

14. The device of claim 12, wherein:

the threshold is a predetermined threshold that is programmed into the first piconet operable device.

15. The device of claim 11, wherein:

the piconet operable device is a first piconet operable device that operates within the first piconet that substantially occupies a first region;

a second piconet operable device operates within the second piconet that substantially occupies a second region; and the first region and the second region occupy at least a portion of common space.

16. The device of claim 15, wherein:

collisions between symbols within the first piconet and symbols within the second piconet occur according to a structured interference pattern.

17. The device of claim 15, wherein:
the first symbol collides with the second symbol that is received by the second piconet operable device before the first symbol is received by the first piconet operable device.

18. The device of claim 15, wherein:
the frequency hopping time-frequency code sequence is a first frequency hopping time-frequency code sequence;
the first symbol processed by the first piconet operable device is a first OFDM (Orthogonal Frequency Division Multiplexing) symbol of a first plurality of OFDM symbols that is modulated according to the first frequency hopping time-frequency code sequence within the first piconet; and
the second symbol processed by the second piconet operable device is a second OFDM symbol of a second plurality of OFDM symbols that is modulated according to a second frequency hopping time-frequency code sequence within the second piconet.

19. The device of claim 18, wherein:
the first frequency hopping time-frequency code sequence employs a duty cycle of approximately one-half when modulating the first plurality of OFDM symbols; and
the second frequency hopping time-frequency code sequence employs a duty cycle of approximately one-half when modulating the second plurality of OFDM symbols.

20. The device of claim 19, wherein:
the first frequency hopping time-frequency code sequence operates based on a three band system;
the second frequency hopping time-frequency code sequence operates based on a three band system; and
a symbol collision occurs between the first piconet and the second piconet at most one time per three symbols.

21. A piconet operable device, the device comprising:
a radio front end that receives and filters a continuous time signal;
an ADC (Analog to Digital Converter) that samples the received and filtered continuous time signal thereby generating a discrete time signal and extracting I, Q (In-phase, Quadrature) components there from;
a demodulator that receives the I, Q components and performs symbol mapping of the I, Q components thereby generating a sequence of discrete-valued modulation symbols; wherein:
the demodulator selectively performs interference compensation of a first symbol of the sequence of discrete-valued modulation symbols by selectively de-weighting the symbol based on structured interference existent therein;
the demodulator detects an energy of the first symbol of the sequence of discrete-valued modulation symbols;
the demodulator compares the energy of the first symbol to a predetermined energy;
the demodulator determines whether a difference between the energy of the first symbol and the predetermined energy exceeds a threshold;
when the difference exceeds the threshold, the demodulator appropriately de-weights the first symbol using a predetermined de-weighting factor thereby generating a de-weighted first symbol;
when the difference does not exceed the threshold, the demodulator does not modify the first symbol; and
a decoder that decodes the de-weighted first symbol or the unmodified first symbol to make a best estimate of the at least one information bit contained therein; and
wherein:
the piconet operable device operates within a first piconet;
before being received by the piconet operable device, the first symbol collides with a second symbol transmitted within a second piconet; and
at least one of the first symbol and the second symbol is modulated using a frequency hopping time-frequency code sequence that employs a duty cycle of approximately one-half.

22. The device of claim 21, wherein:
the demodulator modifies the threshold in real time based on a change in an operating condition of the first piconet in which the piconet operable device is situated.

23. The device of claim 21, wherein:
the threshold is a predetermined threshold that is programmed into the first piconet operable device.

24. The device of claim 21, wherein:
the piconet operable device is a first piconet operable device that operates within the first piconet that substantially occupies a first region;
a second piconet operable device operates within the second piconet that substantially occupies a second region; and
the first region and the second region occupy at least a portion of common space.

25. The device of claim 24, wherein:
collisions between symbols within the first piconet and symbols within the second piconet occur according to a structured interference pattern.

26. The device of claim 24, wherein:
the first symbol collides with the second symbol that is received by the second piconet operable device before the first symbol is received by the first piconet operable device.

27. The device of claim 24, wherein:
the frequency hopping time-frequency code sequence is a first frequency hopping time-frequency code sequence;
the first symbol processed by the first piconet operable device is a first OFDM (Orthogonal Frequency Division Multiplexing) symbol of a first plurality of OFDM symbols that is modulated according to the first frequency hopping time-frequency code sequence within the first piconet; and
the second symbol processed by the second piconet operable device is a second OFDM symbol of a second plurality of OFDM symbols that is modulated according to a second frequency hopping time-frequency code sequence within the second piconet.

28. The device of claim 27, wherein:
the first frequency hopping time-frequency code sequence employs a duty cycle of approximately one-half when modulating the first plurality of OFDM symbols; and
the second frequency hopping time-frequency code sequence employs a duty cycle of approximately one-half when modulating the second plurality of OFDM symbols.

29. The device of claim 28, wherein:
the first frequency hopping time-frequency code sequence operates based on a three band system;
the second frequency hopping time-frequency code sequence operates based on a three band system; and
a symbol collision occurs between the first piconet and the second piconet at most one time per three symbols.

* * * * *